US009396738B2

(12) United States Patent
Abdelal et al.

(10) Patent No.: US 9,396,738 B2
(45) Date of Patent: Jul. 19, 2016

(54) METHODS AND APPARATUS FOR SIGNAL QUALITY ANALYSIS

(71) Applicant: Sonus Networks, Inc., Westford, MA (US)

(72) Inventors: Ahmed Abdelal, North Andover, MA (US); Vladimir Botchev, Nashua, NH (US); Wassim Matragi, North Andover, MA (US)

(73) Assignee: SONUS NETWORKS, INC., Westford, MA (US)

( * ) Notice: Subject to any disclaimer, the term of this patent is extended or adjusted under 35 U.S.C. 154(b) by 188 days.

(21) Appl. No.: 13/907,793

(22) Filed: May 31, 2013

(65) Prior Publication Data

US 2014/0358526 A1    Dec. 4, 2014

(51) Int. Cl.
*G10L 25/30*   (2013.01)
*G10L 15/16*   (2006.01)
*G10L 25/69*   (2013.01)
*H04L 12/26*   (2006.01)
*H04L 29/06*   (2006.01)

(52) U.S. Cl.
CPC ............... *G10L 25/30* (2013.01); *G10L 15/16* (2013.01); *G10L 25/69* (2013.01); *H04L 12/26* (2013.01); *H04L 43/0829* (2013.01); *H04L 65/80* (2013.01)

(58) Field of Classification Search
None
See application file for complete search history.

(56) References Cited

U.S. PATENT DOCUMENTS

| | | | |
|---|---|---|---|
| 4,780,886 A | 10/1988 | Maddens | |
| 4,860,360 A | 8/1989 | Boggs | |
| 6,804,651 B2 | 10/2004 | Juric et al. | |
| 7,379,864 B2 | 5/2008 | Lee et al. | |
| 7,606,704 B2 | 10/2009 | Gray et al. | |
| 7,856,355 B2 | 12/2010 | Kim | |
| 2003/0171922 A1 | 9/2003 | Beerends et al. | |
| 2004/0034492 A1* | 2/2004 | Conway | H04L 43/0829 702/81 |
| 2004/0078197 A1 | 4/2004 | Beerends et al. | |
| 2007/0011006 A1* | 1/2007 | Kim | H04M 3/2236 704/233 |
| 2008/0010065 A1* | 1/2008 | Bratt | G06K 9/6222 704/246 |

(Continued)

OTHER PUBLICATIONS

Malfait et al "P.563—The ITU-T Standard for Single-Ended Speech Quality Assessment" IEEE Trans. Audio, Speech, and Language Processing, Nov. 2006.*

(Continued)

*Primary Examiner* — Pierre-Louis Desir
*Assistant Examiner* — Yi-Sheng Wang
(74) *Attorney, Agent, or Firm* — Stephen T. Straub; Ronald P. Straub; Michael P. Straub

(57) ABSTRACT

A non-intrusive objective speech quality assessment is performed on a degraded speech signal. The methods are well suited for systems where random and bursty packet losses may occur and/or packet stream regeneration may also occur prior to speech signal quality assessment. In one embodiment received packetized speech is analyzed to determine to an overall final signal quality score. A limited set of trained neural networks, e.g., 5, corresponding to different signal features, each determine a signal feature quality score. A trained joint quality score determination module determines a joint quality score based on the signal feature quality scores. Packet loss is estimated based on received packet header information and/or detected gap durations. The determined joint quality score is adjusted, based on estimated packet loss information obtained from examining the speech signal, network level statistics and/or codec parameters to generate the final quality score.

17 Claims, 12 Drawing Sheets

(56) References Cited

U.S. PATENT DOCUMENTS

| | | | |
|---|---|---|---|
| 2009/0018825 A1 | 1/2009 | Bruhn et al. | |
| 2010/0027431 A1* | 2/2010 | Morrison | H04L 41/0681 370/252 |
| 2011/0119039 A1* | 5/2011 | Grancharov | G10L 25/69 703/2 |
| 2012/0106379 A1* | 5/2012 | Hamaguchi | H04L 41/142 370/252 |
| 2012/0116759 A1* | 5/2012 | Folkesson | G10L 25/69 704/226 |

OTHER PUBLICATIONS

Chen et al ("Objective Speech Quality Evaluation Using an Adaptive Neuro-Fuzzy Network", IEEE Signal Processing Letters, vol. 12, Issue 5, May 2005 (pp. 97-116).*
ITU-T G.107 Standard "The E-model: a computational model for use in transmission planning" (Dec. 2011).*
Mohamed et al "Audio Qality Assessment in Packet Networks: an "Inter-subjective" Neural Network Model" ICOIN-15 2001.*
Christian Hoene, Holger Karl, Adam Wolisz, A Perceptual Quality Model Intended for Adaptive VoIP Applications, Int. J. Commun. Syst. 2005. (pp. 1-22).
Lingfen Sun and Emmanuel C. Ifeachor, Voice Quality Prediction Models and Their Application in VoIP Networks, IEEE Transactions on Multimedia, vol. 8, No. 4, Aug. 2006. (pp. 809-820).
P. Gray, M.P. Hollier, and R.E. Massara, Non-Intrusive Speech-Quality Assessment using Vocal-Tract Models, IEE Proc.-Vis. Image Signal Process., vol. 147, No. 6, Dec. 2000. (pp. 493-501).
Wael Cherif, Adlen Ksentini, Daniel Negru, Mamadou Sidibe, A_PSQA: Pesq-like Non-Intrusive Tool for QoE Prediction in VoIP Services, In Proceedings of IEEE International Conference on Communications, Jun. 2012. (pp. 2152-2156).
Jing Wang, Ying Zhang, Yuling Song, Shenghui Zhao, Jingming Kuang, An improved non-intrusive objective speech quality evaluation based on FGMM and FNN, In Proceedings of 3rd International Congress on Image and Signal Processing (CISP), Oct. 2010. (pp. 3495-3499).
Volodya Grancharov, David Y. Zhao, Jonas Lindblom, and W. Bastiaan Kleijn, Non-Intrusive Speech Quality Assessment with Low Computational Complexity, In Proceedings of 9th International Conference on Spoken Language Processing (ICSLP), Sep. 2006. (pp. 189-192).
W. Li, R. Kubichek, Output-Based Objective Speech Quality Measurement Using Continues Hidden Markov Model, In Proceedings of Seventh International Symposium on Signal Processing and Its Applications, Jul. 2003. (pp. 389-392).
G. Chen, V. Parsa, Output-Based Speech Quality Evaluation by Measuring Perceptual Spectral Density Distribution, Electronics Letters, vol. 40 No. 12, Jun. 10, 2004. (pp. 1-2).
A. Raja, C. Flanagan, Real-Time, Non-intrusive Speech Quality Estimation: A Signal-Based Model, In Proceedings of the 11th European Conference on Genetic Programming, 2008. (pp. 37-48).
Guo Chen and Vijay Parsa, Objective Speech Quality Evaluation Using an Adaptive Neuro-Fuzzy Network, IEEE Signal Processing Letters, vol. 12 , Issue: 5, May 2005. (pp. 97-116).
A. Mandi, D. Picovici, New single-ended objective measure for non-intrusive speech quality evaluation, Signal, Image and Video Processing vol. 4, No. 1 (2010), (pp. 23-38).
A. Mandi, T. Murphy, A KD-Tree Based Non-Intrusive Speech Quality Evaluation for Telephony Systems, In Proceeding of 14th International Workshop on Multimedia Communications and Services, Jun. 2007. (pp. 217-220).
Z. Gáspár, I. Gócza, Assessment of VoIP quality using Bayesian Networks, In Proceedings of 15th IEEE Mediterranean Electrotechnical Conference (MELECON), Apr. 2010. (pp. 1389-1393).
Ahmed Tarraf and Martin Meyers, Neural Network-Based Voice Quality Measurement Technique, In Proceedings of IEEE International Symposium on Computers and Communications (ISCC), 1999. (pp. 375-381).
Volodya Grancharov, David Y. Zhao, Jonas Lindblom, and W. Bastiaan Kleijn, Low Complexity, Non-Intrusive Speech Quality Assessment, IEEE Transactions on Audio, Speech, and Language Processing, vol. 14, Issue 6, Nov. 2006. (pp. 1-9).
Tiago H. Falk and Wai-Yip Chan, Feature Mining for GMM-Based Speech Quality Measurement, In Proceeding of Conference Record of the Thirty-Eighth Asilomar Conference on Signals, Systems and Computers, Nov. 2004. (pp. 1-5).
Tiago H. Falk, Qingfeng Xu, and Wai-Yip Chan, Non-Intrusive GMM-Based Speech Quality Measurement, In Proceedings of IEEE International Conference on Acoustics, Speech, and Signal Processing (ICASSP), Mar. 2005. (pp. 1-4)
Tiago H. Falk and Wai-Yip Chan, Enhanced Non-Intrusive Speech Quality Measurement Using Degradation Models, In Proceedings of IEEE International Conference on Acoustics, Speech, and Signal Processing (ICASSP), May 2006. (pp. 1-4).
Lingfen Sun and Emmanuel C. Ifeachor, Perceived Speech Quality Prediction for Voice over IP-based Networks, In Proceeding of IEEE International Conference on Communications (ICC), 2002. (pp. 2573-2577).
Mohammad Abareghi, M. Mehdi Homayounpour, Mehdi Dehghan, and Anahita Davoodi, Improved ITU-P.563 Non-Intrusive Speech Quality Assessment Method for Covering VOIP Conditions, In Proceeding of 10th International Conference on Advanced Communication Technology (ICACT), 2008. (pp. 354-357).
Samir Mohamed, Francisco Cervantes-Perez and Hossam Afifi, Audio Quality Assessment in Packet Networks: an "Inter-Subjective" Neural Network Model, In Proceeding of 15th International Conference on Information Networking, 2001. (pp. 579-586).
Yan Tian-Yun, Wei Min, Wei Wei, Xu Zhen-Ming, A New Neural Network Measure for Objective Speech Quality Evaluation, In Proceeding of 6th International Conference on Wireless Communications Networking and Mobile Computing (WiCOM), 2010. (pp. 1-4).
Mohamed M. Meky and Tarek N. Saadawi, Prediction of Speech Quality Using Radial Basis Functions Neural Networks, In Proceeding of 2nd IEEE Symposium on Computers and Communications (ISCC), 1997. (pp. 174-178).
Jin Liang and Robert Kubichek, Output-Based Objective Speech Quality, In Proceeding of IEEE 44th Vehicular Technology Conference (VTC), 1994. (pp. 1719-1723).
ITU, "Single-Ended Method for Objective Speech Quality Assessment in Narrow-Band Telephony Applications," Int. Telecomm. Union, Geneva, Switzerland, ITU-T Rec. P.563, May 2004. (pp. 1-66).
ITU, "Perceptual Evaluation of Speech Quality (PESQ): An Objective Method for End-To-End Speech Quality Assessment of Narrowband Telephone Networks and Speech Codecs," Int. Telecomm. Union, Geneva, Switzerland, ITU-T Rec. P.862, 2001. (pp. 1-30).
ITU, "The E-model: A Computational Model for use in Transmission Planning," Int. Telecomm. Union, Geneva, Switzerland, ITU-T Rec. G.107, 2009. (pp. 1-28).
A. Abdelal, et al., "Neural Networks-Based Adaptive Call Admission Control in ATM Networks," In Proceedings of International Conference for Artificial Intelligence Applications (ICAIA), Feb. 1999. Y. (pp. 244-259).
Hu, J. Hwang, Handbook of Neural Network Signal Processing, 1st Edition, CRC Press, ISBN-13: 978-0849323591, Sep. 2001. (pp. 1-26).
Aleksandar Lebl and Dragan Mitic, Method for the Determination of Effective Loss Impairment Factor when Sending Short Messages over the Internet, Scientific Technical Review, 2011, vol. 61, No. 3-4, pp. 89-94, 2011.

* cited by examiner

METHODS AND APPARATUS FOR SIGNAL QUALITY ANALYSIS

FIELD

The present invention relates to methods and apparatus for signal quality analysis, e.g., speech signal quality analysis, and more particularly to methods and apparatus for objective, non-intrusive voice quality assessment by the analysis of a signal communicating speech, e.g., a signal which may have been degraded by communication errors and/or noise.

BACKGROUND

The rapid increase in the usage of speech processing algorithms in multi-media and telecommunications applications raises the need for speech quality evaluations. An accurate and reliable assessment of speech quality is thus becoming important for the satisfaction of the end-user or customer of a deployed speech processing system (e.g., cell phone, speech synthesis system, etc.). Assessment of speech quality can be done using subjective listening tests or using objective quality measures. Subjective evaluation involves comparisons of original and processed speech signals by a group of listeners who are asked to rate the quality of speech along a predetermined scale. Objective evaluation often involves a mathematical comparison of the original and processed speech signals. Many objective measures quantify quality by measuring the numerical "distance" between the original and processed signals. For an objective measure to be considered valid, the objective measure normally needs to correlate well with subjective listening tests.

Subjective listening tests provide perhaps the most reliable method for assessment of speech quality. However, these subjective listening tests can be time consuming and require, in most cases, access to trained listeners. For these reasons, researchers have investigated the possibility of devising objective, rather than subjective, measures of speech quality.

Objective quality assessment models can be classified into signal-based models, paramedic models, and protocol-information-based models. The different classifications of objective quality assessment models are further discussed below.

Signal-based models employ speech signals transmitted or otherwise modified by speech processing systems to estimate quality. Two general types of signal-based models exist. These include full reference models and reference-free models.

A full reference model, also known as an "intrusive" or "double-ended" model, depends on a reference (system input) speech signal and a corresponding degraded (system output) speech signal. This allows for the degraded output to be scored to be compared to the original input. In this case, specific test calls are set up and measurement speech signals are transmitted across a network which degrades the communicated signal. From a comparison of the output and input signals, a direct quality estimate or quality-relevant network parameters can be obtained. The International Communication Union (ITU) has standardized a Perceptual Evaluation of Speech Quality as a full reference mode for Narrow Band (NB) speech signals. Unfortunately, this approach requires the availability of the original uncorrupted signal which is often not available at a user location during actual call conditions making such an approach to determining speech signal quality during actual calls impractical for many end users who may seek to measure the quality of a speech signal being communicated by a network, e.g., to assess the impact and/or degradation caused by the communications network to the speech communicated by a call through the network.

A reference-free model, also known as a "non-intrusive" or "single ended" model, depends on the latter degraded signal but does not require the availability of the original uncorrupted original speech signal. Since the reference-free model does not require access to the original speech signal it is considered "single ended" since it depends on the signal at only one end, e.g., the measurement end. In this type of model, a measurement signal is acquired at a specific point of the network during normal network operation. From this signal, network or conversation parameters relevant to quality or indicative of quality can be measured and/or derived from the signal. The ITU has standardized P.563 as a reference free model.

FIG. 1 is a drawing 100 illustrating the computation of intrusive and non-intrusive models. As illustrated in the FIG. 1, the input signal 101, e.g. a speech signal, is supplied to the system to be tested 102. e.g., a telecommunications system. The processed speech signal, being output by the system 102, is labeled as degraded signal 103 since the output signal is degraded in quality as compared to the original input signal.

For non-intrusive (reference free) evaluation model based systems such as system 104, the degraded processed signal is needed to evaluate the signal quality. Thus, as shown in the FIG. 1, the degraded signal 103 is supplied as an input signal to the non-intrusive evaluation system 104. As discussed above, from the supplied degraded, e.g., communicated, signal 103, the non-intrusive evaluation system 104 derives network or conversation parameters relevant to quality, which are output as information 105. Intrusive (full reference) evaluation model based systems such as system 106 need both a reference input signal and a corresponding degraded output signal to evaluate the signal quality. Thus as shown in the FIG. 1, both of these signals (101, 103) are supplied as inputs to the intrusive evaluation system 106. Intrusive evaluation system 106 compares the output and input signals (103, 101) and evaluates a direct quality estimate and/or derives quality-relevant network parameters, which are output as information 107.

Parametric models will now be discussed. Signal-based models use speech signals as input to the quality estimation methods. Thus, to use a signal-based model, at least a prototype implementation or simulation of the transmission channel has to be set up. However, during the network design process, such signals are commonly not available but the network can be characterized by the technical specifications of its elements. Such technical specifications typically include: delay associated with a particular transmission path, the probability that packets get lost or discarded in Internet-Protocol (IP)-based transmission, as well as the type of codec and error concealment techniques used. Many of these specifications can be quantified in terms of planning parameters that enable a parametric estimation of speech quality to be performed prior to the connection becoming alive. While parametric models allow a network's effect on speech to be estimated or predicted without the need for actual signal measurements, quality estimates based on parametric models may be less accurate than actual signal measurements since the number of parameters used may be limited and the parameters may not fully represent or predict the effect of the actual network during real use on a speech signal communicated through the network.

One of the common parametric models is the E-model, that is used to estimate the quality associated with a speech transmission channel. The limitations of the E-model are discussed below. The E-model is limited to the speech impairments caused by packet loss and delay, and the E-model does not take in account impairments due to noise, clipping and codec distortions. In some cases in which a RTP (real-time transport protocol) stream has been terminated at an intermediate node along the call path, e.g., for transcoding, the terminated RTP stream is regenerated. As part of the regeneration process packets may be sequentially numbered making previously lost packets undetectable from the packet numbering of the regenerated RTP stream. Thus a node receiving a regenerated stream communicating a speech signal may be unaware from the packet headers that speech has been lost. Thus depending on the monitoring point across the call path, the packet delay and loss, used by the E-model, may not be accurate. For example, if the monitoring occurs after regeneration, a packet loss count based on RTP packet header numbers may be lower than the actual number of lost packets. A quality score that does not reflect the user perception of the call quality may be reported in such a case. The E-model assesses the speech quality based on network level metrics, such as a missing packet count based on packet header numbers, and thus the E-model is not aware of the content of the actual speech signal. For example, the E-model accounts for all the packet loss measured at the network level and may not accurately reflect the impact on the user perception of the speech quality of the received signal. The E-model does not take into account the location of the packet loss, which can impact user perception. For example, a packet loss that occurs during silence will not impact user perception of speech quality; however, the E-model does not account for differences in user perception as a function of whether the packet loss occurred during a silence. In addition, the E-model does not distinguish between a packet loss which occurs near the beginning of a call from a packet loss which occurs near the end of a call. From a user perception viewpoint, a packet loss near the end of a call may more negatively impact the user's perception of speech quality than a packet loss near the beginning of a call. The E-model approach reduces the MOS score based on the number of packets lost and does not take into account the location of the packet loss which may impact user perception of speech quality.

Protocol-Information-based models will now be discussed. The E-model has also been used for monitoring quality of VoIP (voice over internet protocol), but often does not provide accurate measurements for individual calls. As a consequence, alternative models have been developed for measuring and/or monitoring the quality of VoIP communicated speech for individual calls. Instead of using the voice payload of the transmitted packets, the known protocol information model exploits protocol header information such as the timestamps and sequence numbers of RTP headers for delay and packet-loss related information, and information on the end-point behavior such as dropped packet statistics or PLC information. The main goal of such models is to enable passive network and/or end-point monitoring with a lightweight parametric approach, while at the same time avoiding privacy concerns when accessing user related payload information.

Unfortunately, models and/or monitoring techniques which are based solely on protocol information and/or header information may not accurately reflect the quality of a received speech signal and/or the loss of speech information during the process of communicating the speech signal through a network, e.g., due to packet stream regeneration and/or other factors.

In view of the above, it should be appreciated that there is a need for methods and/or apparatus which allow the actual content of a received speech signal into consideration when measuring and/or estimating received speech signal quality without merely relying on packet header or network level information. While it is desirable to take the actual content of a received signal into consideration in generating a signal quality measurement it is desirable that the content of a received signal be used in a manner that does not create an excessive processing burden on the system generating the signal quality metric.

In view of the above it should be appreciated that there is a need for methods and apparatus which overcome one or more the limitations of the various known approaches discussed above, allowing for faster analysis and/or evaluation of signal quality and/or are more accurate than the known approaches.

SUMMARY

Some exemplary embodiments are directed to novel methods and/or apparatus for performing an objective, non-intrusive, voice quality assessment based on the analysis of a speech signal, e.g., a speech signal degraded as a result of communication through a communications network. Various exemplary embodiments are well suited for numerous applications including, e.g., non-intrusive voice quality monitoring, perceptional-based adaptive codec type/mode control, perceptional-based adaptive sender-bit rate control, and perceptional-based playout-buffer optimization. At least some of the methods take into consideration, when generating a quality estimate, e.g., metric indicating received speech signal quality, the actual content of a received speech signal, e.g., to estimate the loss of packets and/or speech, while also taking into consideration one or more other factors such as the coding/decoding (codec) used for speech signal coding and/or data rate of the speech signal.

Various embodiments are directed to novel methods and/or apparatus for performing non-intrusive objective speech quality assessments, e.g., a quality assessment on a received speech signal that was communicated through a communications network. The speech signal may be communicated via a telephone call transmitted through a network. Various exemplary embodiments of the present invention may be viewed as an improvement over the ITU-T P.563 standard in one or more ways.

Some exemplary novel methods are lightweight, e.g., in terms of computational complexity, and thus, in at least some embodiments, the method runs faster, e.g., around ten times faster, than the ITU-T P.563 standard method if hardware of similar complexity were used for the standard method. In addition to speed/relatively low computational complexity, some embodiments of the present invention are more accurate than the ITU-T P.563 standard method, in terms of handling random and bursty packet losses.

An advantage of a lightweight approach, in accordance with various embodiments of the present inventions, is that the analysis can be performed in real time or near real time, e.g., as a call is in progress, as opposed to the ITU-T P.563 standard method, which may take a couple of seconds to evaluate a 20 msec voice sample. The lightweight approach can be used offline or real time. The lightweight approach can be, and sometimes is, used to tune the coding parameters, e.g., during an in-progress call. In some embodiments, a real time score is used to adjust quality during a call, e.g., on an ongoing basis during a call. For example, a long signal corresponding to multiple minutes can be chopped into 20 msec voice samples, which are evaluated, e.g., generating scores for intervals in real time, and feedback from the evaluations are used to change encoding parameters, change codec, change packet rate, change packet size, and/or adjust a codec, while operating.

Some embodiments implemented in accordance with the present invention are hybrids in terms of how they are implemented in the sense that they perform a quality assessment based on a combination of metrics collected from signal analysis with metrics/parameters collected both from the network-layer and/or information about the speech codecs along with information obtained from an actual examination of the received signal whose quality is being assessed. Some embodiments, using a hybrid approach, use network information about the codec as well as signal information to come up with a meaningful signal quality measurement.

Various exemplary methods, in accordance with the present invention, combine signal processing with machine learning. The learning phase, e.g. a neural network training phase, may be, and in some embodiments is, implemented prior to system deployment. The training may be performed using known input data sets which have been scored by actual listeners. Such training may be preformed using data sets and scores from commercially available reference data and score sets.

In various exemplary embodiments, received packetized speech is analyzed, based on a limited set of signal features and/or to generate an estimate of packet loss based on the content of the received signal. An overall signal quality score is then generated based on neural network scoring of the received signal and various network parameters and/or codec information in addition to, or in combination with, an estimate of packet loss generated based on the content of the received signal.

In some such exemplary embodiments, five trained neural networks, corresponding to five different signal features, each determine a signal feature quality score. In some such embodiments, each of the five trained neural networks use one the following five different sets of speech signaling measurements: a set of signal to noise ratio measurements; a set of spectral clarity measurements; a set of linear prediction skew measurements; a set of linear prediction kurtosis measurements; and a set of pitch average measurements. More or fewer neural networks and/or speech features may be used depending on the particular embodiment and five is intended to be exemplary of one particular embodiment. In the exemplary embodiment a trained joint quality score determination neural network determines an overall joint quality score based on the determined signal feature quality scores, e.g., the five individual scores generated by the corresponding individual feature score neural networks.

The overall joint score is adjusted in some embodiments based on other information. In one embodiment, packet loss is estimated based on received packet header information, e.g., packet size and/or packet rate, and detected gap durations, based on detected edges and measured signal energy level of the received signal being monitored in relation to energy level thresholds. An advantage of estimating packet loss, based on measured signal energy levels in accordance with a feature of some embodiments of the present invention, is that packet losses, which occur during silence intervals, which do not impact user perception of speech quality, will not be counted. Thus, this approach gives a better estimate of quality than an approach which uses an E-model to detect packet loss. The determined joint quality score is adjusted, based on estimated packet loss information, network level statistics and/or codec parameters, to determine a final overall quality score. Thus, the final overall quality score may, and in various embodiments does, depend on analysis of a variety of signal features, packet loss and/or the codec used to communicate the speech signal.

An exemplary method of measuring the quality of speech communicated using packets, in accordance with some embodiments, includes: operating a plurality of N neural networks, each neural network processing one of N sets of speech signal feature measurements corresponding to a speech signal recovered from packets communicated via a communications network to generate from the processed set of speech signal feature measurements a signal feature quality score, each of the N different neural networks corresponding to a different one of the N sets of speech signal feature measurements, said N neural networks generating N signal feature quality scores, each one of the N signal feature quality scores corresponding to a different one of N speech signal features. The exemplary method further includes operating a joint quality score determination neural network to generate a joint signal feature quality score from said N signal feature quality scores.

An exemplary apparatus, in accordance with some embodiments, for measuring the quality of speech communicated using packets, includes: a plurality of N neural networks, each neural network being configured to process one of N sets of speech signal feature measurements corresponding to a speech signal recovered from packets communicated via a communications network to generate from the processed set of speech signal feature measurements a signal feature quality score, each of the N different neural networks corresponding to a different one of the N sets of speech signal feature measurements, said N neural networks generating N signal feature quality scores, each one of the N signal feature quality scores corresponding to a different one of N speech signal features. The exemplary apparatus further includes a joint quality score determination neural network configured to generate a joint signal feature quality score from said N signal feature quality scores.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

DETAILED DESCRIPTION OF THE FIGURES

Figure 1:
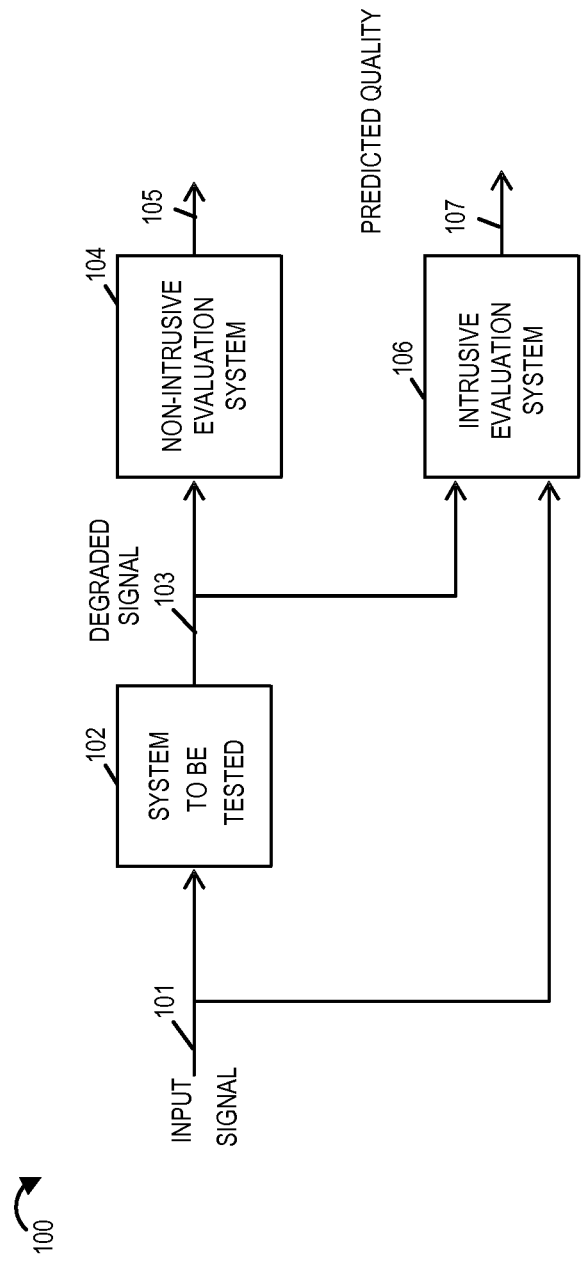
FIG. 1 is a drawing illustrating the computation of intrusive and non-intrusive models.
Figure 2:
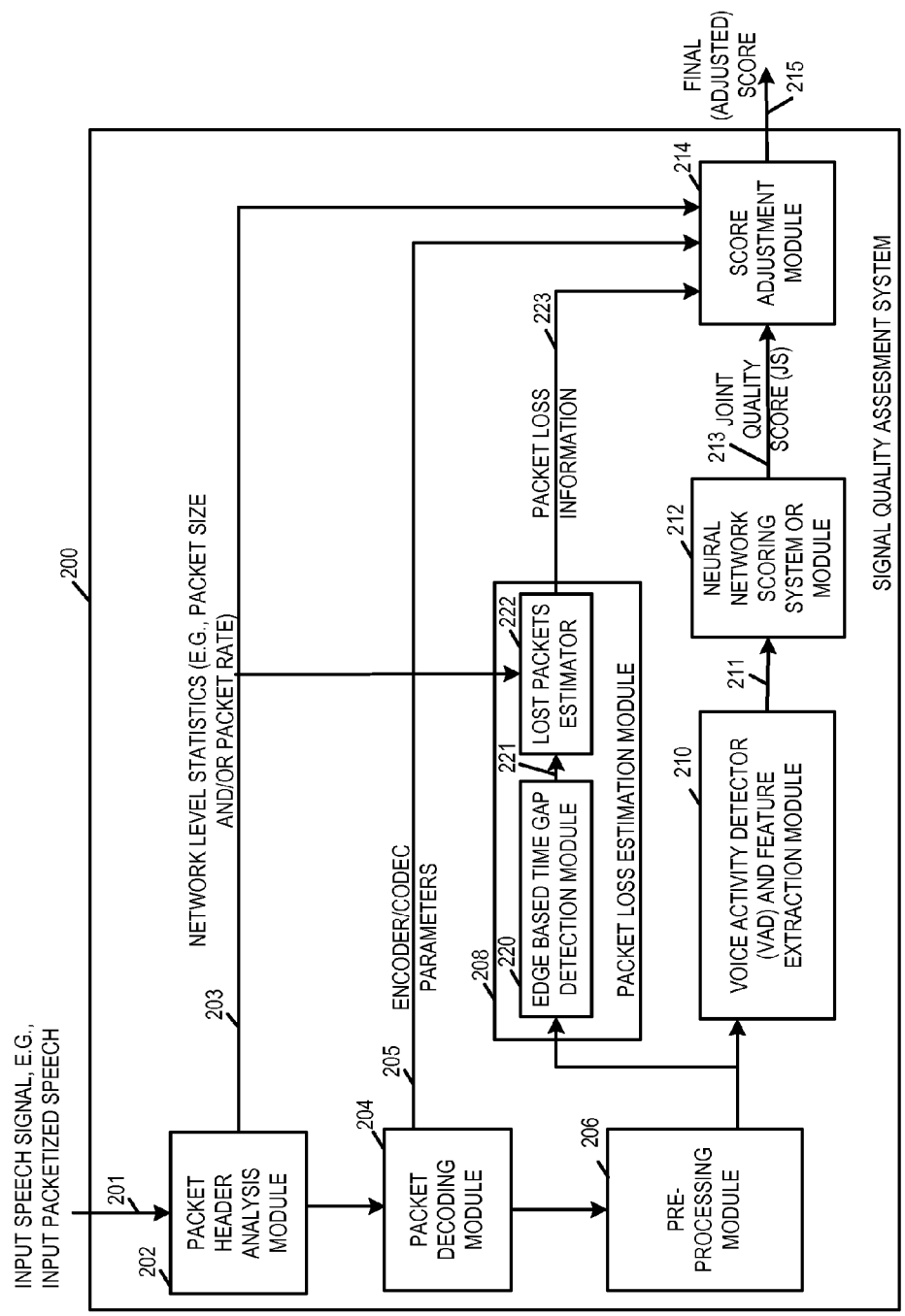
FIG. 2 illustrates an exemplary quality assessment system, in accordance with various exemplary embodiments of the present invention.

FIG. 2 illustrates the architecture of an exemplary signal quality assessment system 200 from a functional perspective, in accordance with various embodiments of the present invention. FIG. 2 shows some of the elements of the exemplary signal quality assessment system 200 which are used to process received packets communicating speech signal. The exemplary signal quality assessment system 200 includes a packet header analysis module 202, a packet decoding module 204, a pre-processing module 206, a packet loss estimation module 208, a voice activity detection (VAD) and feature extraction module 210, a neural network scoring system or module 212, and a score adjustment module 214. Various modules shown in the system 200 can be implemented in software, hardware or a combination of software and hardware. In some embodiments, the modules in FIG. 2 are implemented in hardware within the system 200, e.g., as individual circuits.

In accordance with an aspect of various embodiments, an input speech signal 201 is analyzed and a set of features, e.g., speech signal quality features, are extracted by the signal quality assessment system 200. It has been observed that a selected set of features is generally sufficient to characterize the quality of a speech signal, and the features are generally not influenced by the speaker's gender. The features are extracted for each media buffer used in a system. For example, in some embodiments a ten seconds media buffer size is selected so that enough speech is captured to provide statistical consistency of the measured features.

As will be discussed, in various embodiments the extracted features are passed to a neural network scoring system 212. Neural network scoring system 212 is trained to score the media quality given the input set of features. In some embodiments a bank of back-propagation Neural Networks (NN) are used in the neural network scoring system 212.

In some embodiments, packets communicating the input speech signal 201, e.g., input packetized speech signal, is captured and supplied to the signal quality assessment system 200. The packet header analysis module 202 performs analysis of the header of the received packets to determine network level statistics 203, e.g., a packet size and/or a packet rate. In some embodiments the packet size information is expressed in terms of a time period, e.g., milli seconds. The packet size and/or packet rate information is used in determining an estimate of the lost packets and an adjustment to be made to a quality score as will be discussed. The determined network level statistics 203 is then provided to the packet loss estimation module 208 and the score adjustment module 214.

After the packet header analysis, the packets are processed by the packet decoding module 204 which performs decoding operations. The packet decoding module 204 derives encoder parameters 205 corresponding to the encoder that was used to encode the packets being analyzed. The encoding parameters 205, derived by the decoding module 204, include, e.g., the packet size and/or codec type. The encoding parameters 205 provide information regarding the robustness of the codec used for encoding the packet stream. Different coding schemes/codecs have different robustness, e.g., robustness to packet loss. In some embodiments, the higher the compression used by the codec, the less robust the codec becomes to packet loss. The encoder parameters 205 are also provided to the score adjustment module 214 as illustrated in FIG. 2.

Following packet decoding, the packets are supplied to the pre-processing module 206. The pre-processing module 206 performs buffer level normalization, e.g., as specified in ITU recommendations related to speech level measurements, and filtering with a standard, by ITU standards, headset filter. The output of the pre-processing module 206 is input to the packet loss estimation module 208 and the VAD and feature extraction module 210.

The packet loss estimation module 208 determines an estimate of the number of lost packets in the communication of the speech signal in accordance with the features of the invention. The packet loss estimation module 208 includes an edge based time gap detection module 220 and a lost packets estimator 222. In some embodiments the determination of the number of lost packets in the communication of the speech signal includes using the edge based time gap detection module 220 to determine an amount of time between a detected falling edge and a detected rising edge corresponding to a signal energy drop in the recovered speech signal during which the signal energy level of the recovered speech signal stays below an energy level threshold level. Thus the edge based time gap detection module 220 detects the time duration between a detected falling edge and a detected rising edge which indicates duration of time during which packets are lost. Time duration information 221 output from module 220 is provided to the lost packets estimator 222 which also receives the packet size (e.g., converted to millisecond) and/or packet rate information (e.g., providing packets/second) 203 from the packet header analysis module 202. Using the time duration information 221 and the packet size and/or packet rate information 203 the lost packet estimator 222 estimates a number of lost packets during the time interval between the falling and rising edges and outputs packet loss information 223. The packet loss information 223, e.g., a determined estimate of the number of lost packets is provided to the score adjustment module 214.

The voice activity detector (VAD) and feature extraction module 210, can be implemented using one of various types of voice activity detectors. For example in some embodiments a simple energy based voice activity detectors with adaptive thresholds is used while in other embodiments a VAD such as the one used in current voice codecs may be selected for use. In various embodiments several features can be extracted from a speech signal that provide information about its quality. In some embodiments signal features that are selected to estimate speech conversational quality include the averaged pitch, an estimation of the global signal to noise ratio in the portion of a captured signal to be analyzed, etc. Various other features may, and in some embodiments are, extracted from a standard autoregressive modeling of the current portion of the captured speech signal.

Two basic ways can be adopted for using the extracted signal features for quality estimation, one is to use the entire vector of features as they unfold in time, the other is to use a simple or weighted average of the vector components. The first method permits capturing the dynamics of the features, while the second one does not. In various embodiments, the second method which has the merit of being simpler is preferred and adopted to use the extracted signal features for signal quality estimation. It has been observed that the lack of dynamics of the features does not have a noticeable impact on the signal quality scoring.

Figure 3:
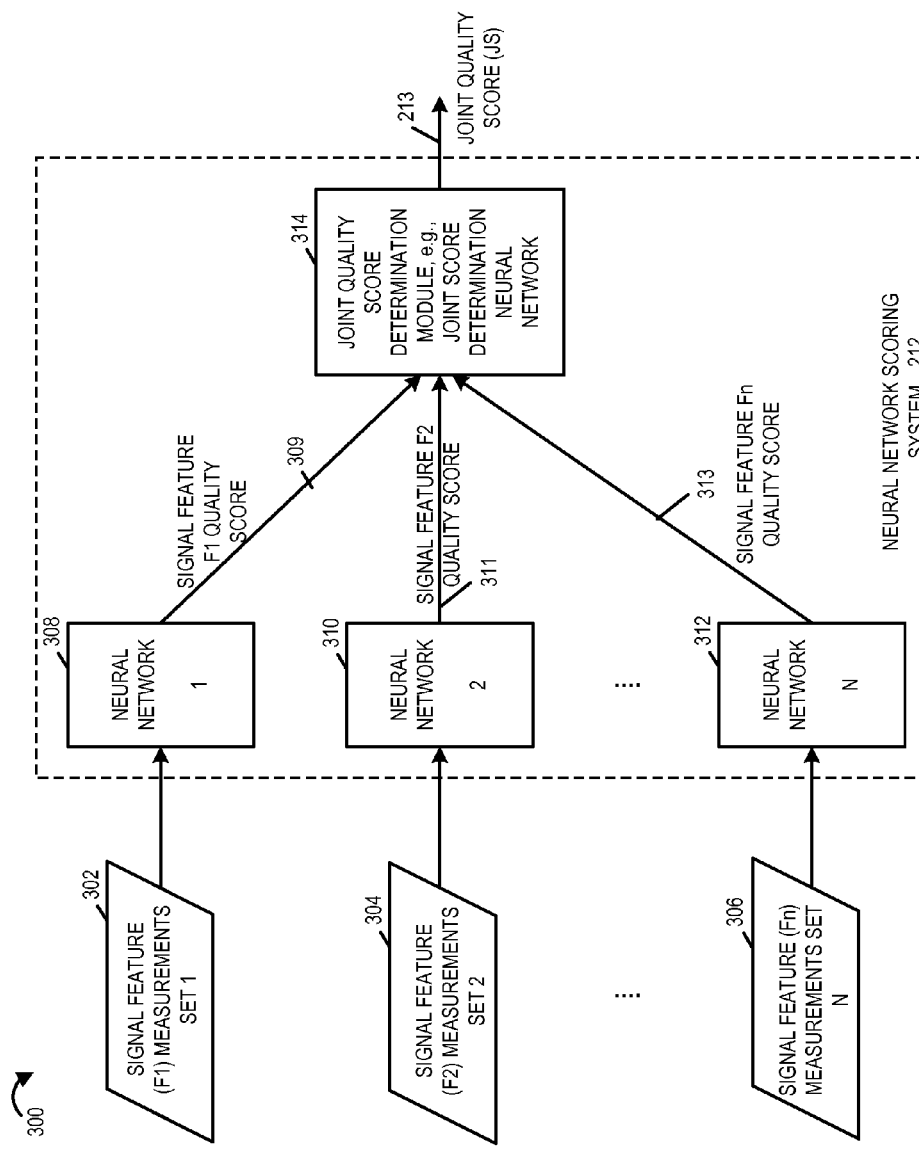
FIG. 3 illustrates an exemplary neural network scoring system, in accordance with an exemplary embodiment.

In various embodiments, the set of features 211 extracted by the module 210 is mapped to a quality score, e.g., a signal feature quality score. The neural network scoring system 212 which, in some embodiments, includes a two stage neural network architecture is used for generating the signal feature quality scores corresponding to the extracted signal features 211 which are supplied to the neural network scoring system 212. In order that the neural network scoring system 212 outputs a score that can be mapped to a score according to a known standard, e.g., such as a Mean Opinion Score (MOS) score, standard ITU databases, labeled by subjective MOS scores, are used in some embodiments to train back-propagation type of neural networks used in the neural network scoring system 212. ITU-T Rec. P. Supplement 23, "ITU-T coded-speech database," International Telecommunication Union, 1998 is one exemplary database which can be used as a source of training data and scores. To train the back-propagation type neural networks used in the neural network scoring system 212 features extracted from the standard ITU speech signals and the corresponding subjective MOS scores are used. In some other embodiments Radial Basis Functions (RBF) neural networks or Adaptive Neuro-Fuzzy Inference System (ANFIS) networks may be used but for voice signal feature quality scoring such networks as the ANFIS networks, are much more complex in terms of implementation. The details regarding the neural network scoring system 212 are illustrated in FIG. 3 and discussed later. The output of the neural network scoring system 212 is a joint quality score (JS) 213 corresponding to the extracted signal features 211.

The score adjustment module 214 receives the joint signal quality score JS 213 generated by the neural network scoring system 212 and performs adjustments to the score taking into consideration various factors including, e.g., encoder/codec parameters 205, packet size communicated in statistics 203, and estimated number of packets lost in communication included in packet loss information 223. The information (203, 205, 223) used for making score adjustments is received by the score adjustment module 214 from various other elements (202, 204, 222) of the system 200 as illustrated. In some embodiments the score adjustment module 214 generates an adjustment factor (AF) to be used in performing adjustment to the joint quality score. The calculation of adjustment factor is a multistep operation which, in some embodiments, is performed in the following manner:

i. First an entity referred to as R factor is calculated for the given type of codec with the packet loss probability of zero, the packet loss probability being the probability that packet(s) are lost in communication. The R factor is calculated in accordance with the following equation:

$$R\text{ factor}=93.2-I_d-I_{e\text{-}eff},\quad(1)$$

where $I_{e\text{-}eff}$ is calculated as $$I_{e\text{-}eff}=I_e+(95-I_e)(Ppl/(Ppl+Bpl))\quad(2)$$

where $I_d$ is the impairment factor representing all impairments due to delay of voice signals;

$I_{e\text{-}eff}$ represents subjective quality impairments due to low bit rate CODEC, packet/cell loss, $I_e$ is the Equipment Impairment Factor at zero packet-loss, Ppl is the Packet-loss probability expressed in percents, and Bpl is the Packet-loss Robustness Factor. The Packet-loss Robustness Factor Bpl represents the resistivity of the used coding and decoding technique (i.e. compression and decompression) of a voice signal on packet loss. As discussed the robustness information is derived from the encoder/codec parameters supplied by the packet decoding module 204.

ii. Secondly, the calculated R factor at zero packet-loss (Ppl=0) will be mapped to a MOS score, e.g., using a MOS score mapping table or a formula, as there is a predetermined known relationship between a calculated R factor and MOS score value. For discussion purposes this MOS score at zero packet-loss (Ppl=0) is represented as $M_O$.

iii. Next packet loss probability (Ppl) is calculated as follows:

Ppl=Number of packets lost/Total number of packets, where the information regarding number of packets lost is provided by the edge based packet loss detection module 208. Furthermore, the robustness factor (Bpl) is determined, e.g., from a table that includes Bpl information for various different types of codecs. The information regarding the type of codec used to encode the packets is determined and provided by the packet decoding module 204.

v. Using the determined packet loss probability (Ppl) and the robustness factor (Bpl), R factor is calculated using equations (1) and (2).

v. Next the R factor calculated using the Ppl and Bpl values is mapped to a MOS score in a similar manner as discussed in step (ii). For discussion purposes this MOS score is represented as $M_P$.

vi. Next a difference in the MOS score determined in step (ii) and that determined in step (v) is calculated. This difference is referred to as the score adjustment factor (AF) and is calculated as follows:

$$AF=M_o-M_P;\quad(3)$$

i.e., AF=(MOS score at Ppl=0)−(MOS score calculated at non zero Ppl value), where AF≥0.

vii. Finally, the score adjustment module 214 calculates the final quality score 215 by subtracting the determined adjustment fact (AF) from the joint quality score 213 received as input from the neural network system 212. Thus the final score 215 is calculated as:

$$\text{Final Score}=JS-AF\quad(4)$$

FIG. 3 is a drawing 300 illustrating a portion of the system 200 including the neural network scoring system 212 in greater detail. As illustrated in the drawing 300, a plurality of N sets of signal feature measurements corresponding to the signal features (signal feature (F1) measurements set 1 302, signal feature (F2) measurements set 2 304, . . . signal feature (Fn) measurements set N 306) extracted by the feature extraction module 210, are supplied to a set of N neural networks (neural network 1 308, neural network 2 310, . . . , neural network N 312), respectively. Each set of signal feature measurements (302, 304, 306) serves as an input to a different neural network in the set of N neural networks (308, 310, . . . 312) as illustrated. It should be appreciated that F1, F2, . . . , Fn each represents a speech signal feature extracted from a speech signal recovered from packets communicated via a communications network. In some embodiments the N sets of signal feature measurements include speech signal measurements from a group of five sets of speech signal feature measurements including: i) a set of signal to noise ratio measurements; ii) a set of spectral clarity measurements; iii) a set of linear prediction skew measurements; iv) a set of linear prediction kurtosis measurements and v) a set of pitch average measurements.

In accordance with the features of various embodiments, each neural network in the plurality of N neural networks (308, 310, ..., 312) processes one of the N sets of speech signal feature measurements to generate from the processed set of speech signal feature measurements a signal feature quality score corresponding to the feature for which measurements have been provided as input to the corresponding neural network. Each of the N different neural networks (308, 310, ..., 312) corresponds to a different one of the N sets of speech signal feature measurements, and as shown in FIG. 3, the N neural networks (308, 310, ..., 312) generate N signal feature quality scores (signal feature F1 quality score 309, signal feature F2 quality score 311, ..., signal feature Fn quality score 313), respectively. Each one of the N signal scores corresponding to a different one of the N speech signal features F1 through Fn. In various embodiments each neural network (308, 310, ..., 312) acts as a regression approximator, and each one of the neural networks (308, 310, ..., 312) is trained using the extracted features.

In some embodiments, the neural networks (308, 310, ..., 312) are standard back-propagation neural network units. In some such embodiments, there are 5 five inputs and 5 corresponding neural networks, one for each of 5 different features extracted from the speech signal. In some embodiments, the neural network units (308, 310, ..., 312) are trained off-line with labeled databases of speech signals. The joint quality score determination module 314 is configured to generate a joint signal feature quality score 213 from the N speech signal feature scores (309, 311, ..., 313) which are provided as an input to the joint quality score determination module 314. The joint signal feature quality score 213 represents an estimate of the speech signal quality of the recovered speech signal without adjustments to balance packet loss and other equipment related impairment. The joint quality score determination module 314, which in some embodiments also includes a back-propagation neural network, is also trained in some embodiments with the labels of the speech databases. However, the inputs to the joint quality score determination module 314 come from the outputs of the component neural network units (308, 310, ..., 312). Therefore the component neural network units (308, 310, ..., 312) and the joint quality score determination module 314 can be considered to work synchronously. In some embodiments each one of the neural network units (308, 310, ..., 312) outputs its own estimation of MOS score, and the joint quality score determination module 314, for training, takes the true corresponding MOS score from the labeled database as target, and trains accordingly. In some embodiments the joint quality score determination module 314 is implemented either as a non-linear regression function (e.g., a median filter), an averaging function, or another neural network. As shown, the output of the joint quality score determination module 314 is the joint quality score (JS) 213 which in some embodiments is subjected to further processing, e.g., for score adjustments taking the packet loss and/or other factors into consideration as discussed later.

Figure 4:
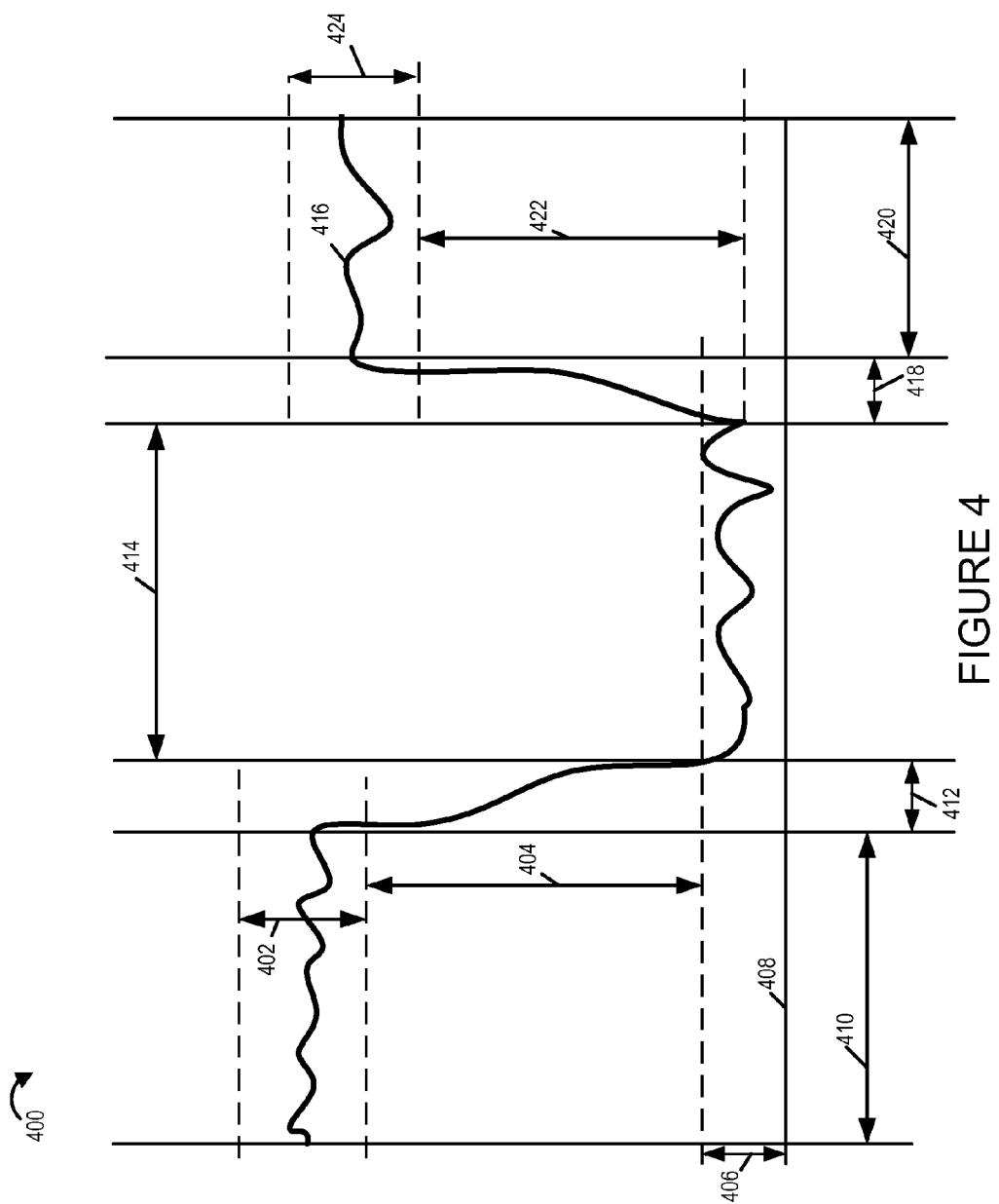
FIG. 4 illustrates an exemplary speech signal energy profile that may be used to estimate packet losses in communication.

FIG. 4 is a drawing 400 illustrating an exemplary speech signal energy profile 416 that may be used to estimate packet losses in communication of a speech signal. In accordance with one feature of various embodiments, packet losses are estimated directly from the captured speech signal. Generally, probable packet losses can be detected if they are not concealed by any form of interpolation or extrapolation into the time slot of the lost packet. Thus un-concealed packet losses can be detected directly from the speech waveform. However, such un-concealed packet losses can be detected more reliably from the signal energy profile of the speech waveform. In accordance with one feature in various embodiments, the signal energy profile is used to detect un-concealed packet losses, e.g., packet losses are estimated based on a signal energy profile corresponding to a captured speech signal. A signal energy profile is obtained by one of a plurality of standard means, for example, a short time running Root Mean Square (RMS) is determined over the speech portion being analyzed. It is observed that usually at locations where there is an unconcealed packet loss, there is a sudden drop in the energy profile. In various embodiments, packet loss detection is conducted on the signal before VAD. Thus, as should be appreciated from the FIG. 2 embodiment of the system 200, the packet loss estimation module 208, including the edge based gap detection module 220, is placed in the system 200 such that packet loss detection can be performed on the recovered speech signal prior to VAD operation. Such an approach facilitates that the packet losses which are reported are the packet losses that affect the speech signal, and the losses in between speech segments or inside silences go undetected. Packet losses in between speech segments or inside silences do not affect the quality of the signal.

In drawing 400, line 416 represents an exemplary signal energy time series corresponding to an exemplary speech signal. Energy is represented along the vertical axis and time is represented along the horizontal axis. Line 408 is a zero line representing a zero energy level. Time interval 412 is a time span corresponding to a falling edge. Time interval 414 is a time span between the end of the falling edge and start of the rising edge. Time interval 414, which corresponds to an interval of packet loss, is greater than or equal to the time period to which a packet corresponds. In various embodiments, the packet size is codec dependent. In one exemplary embodiment an exemplary codec uses a packet size corresponding to a time duration of 20 msec, e.g., 20 msec of audio. Thus, in such an embodiment the data in a packet represents a 20 msec audio signal. In such an embodiment time interval 414 is greater than or equal to 20 msec, e.g., approximately equal to an integer multiple of 20 msec. The size of interval 414 may be, and in some embodiments, is used to determine the number of packets lost, e.g., how many packets, corresponding to the codec in use, fit into interval 414. Time interval 418 is a time span corresponding to a rising edge. Time interval 412 corresponds to a sudden decrease, e.g., a decrease which occurs in under 1 msec, and time interval 418 corresponds to a sudden increase, e.g., an increase which occurs in under 1 msec, for a packet loss situation. In some embodiments, corresponding to packet loss, time interval 412 and time interval 418 are less than 1/10 the duration of time to which a packet corresponds. In some embodiments, corresponding to packet loss, time interval 412 and time interval 418 are less than 1 msec in duration. However, 1 msec is exemplary and other durations are possible, e.g., a sudden decrease may be a decrease which occurs in under 0.75 msec in some embodiments. In other situations, where the energy level decrease and energy level rise are due to a pause in speech rather than from packet loss, the falling and rising transitions can be expected to be much more gradual and relatively longer in duration. In some embodiments gradual increases and decreases in signal energy are not treated a being sudden enough to be indicative of a packet loss and such gradual increase or decrease in signal energy is not used to mark or determine the start of a packet loss which is likely cause a sudden transition in signal energy due to a packet loss.

Energy region 402 is a flatness measure corresponding to time span for flatness 410 before the start of the falling edge. Energy drop 404 is an energy drop corresponding to a falling edge. In various embodiments, the energy drop 404 is measured as a ratio. Energy region 406 is a flatness measure corresponding to the time interval 414 between the falling edge and the rising edge.

Energy rise 422 is an energy rise corresponding to a rising edge. In various embodiments, the energy rise 422 is measured as a ratio. Energy region 422 is a flatness measure corresponding to the time interval 422 following the rising edge. In some embodiments energy drop 404 and energy rise 422 correspond to an energy change which is greater than the energy change to which energy region 406 corresponds.

An energy profile can be generally considered to be a time series. Exemplary speech signal energy profile 416 can be considered to be a signal energy time series 416, as illustrated in FIG. 4. In accordance with an aspect of some embodiments, one dimensional edge detection is applied to signal energy time series 416 to detect rising and falling edges corresponding to signal energy increases and signal energy drops, respectively. Thus, the edge based gap detection module 220, in some embodiments, uses one or more edge detectors, e.g., a Canny edge detector, for performing edge detection, and module 220 determines gaps based on detected edges. In some embodiments, the energy profile time series such as the exemplary energy profile 416 illustrated in FIG. 4 is scanned to detect energy drops that exceed a certain threshold which would indicate a falling edge, in other words the start of a packet loss. A rising edge is indicated by an energy rise in a similar manner.

In summary, in some embodiments, the detector used in the edge based gap detection module 220 detects the edges, then classifies them as falling and rising edges, and then, according to a model for packet loss formation, evaluates the distance between an edge identified as a real falling edge and its neighboring rising edge. In some embodiments one or more constraints are imposed in the process of detecting and classifying the edges, including, e.g., i) the energy values between the two edges have to be below a certain threshold, e.g., flatness measure 406 has to be observed, and ii) the energy profile just before a falling edge and just after a rising edge has to be flat for a certain amount of time, e.g., flatness measure 402 has to be maintained for time span 410 and flatness measure 424 has to be maintained for time span 420. Reliable estimates with this method have been observed for up to 1.5% packet losses. Thus in some embodiments in which the packet losses are expected to be less than or equal to 1.5%, the above described approach is used.

High noise content at the location of the lost packet usually lowers detector performance. A more computationally demanding implementation, a cross correlation pattern matching scheme, can be, and sometimes is, used for estimates of up to 5% packet loss. One exemplary such procedure is that of normalized cross correlation with a typical energy template for a packet loss.

In some embodiments, an echo detection and evaluation module that is ITU standard P.560 and G.131 compliant, is used in the quality assessment system described. Echo detection and evaluation module reuses media data stored for signal quality assessment and, in addition, implements means for capturing far-end media data which is useful for the detection and evaluation processes. In some embodiments, echo evaluation results are presented separately and do not influence the MOS factor computed by the system.

Figure 5:
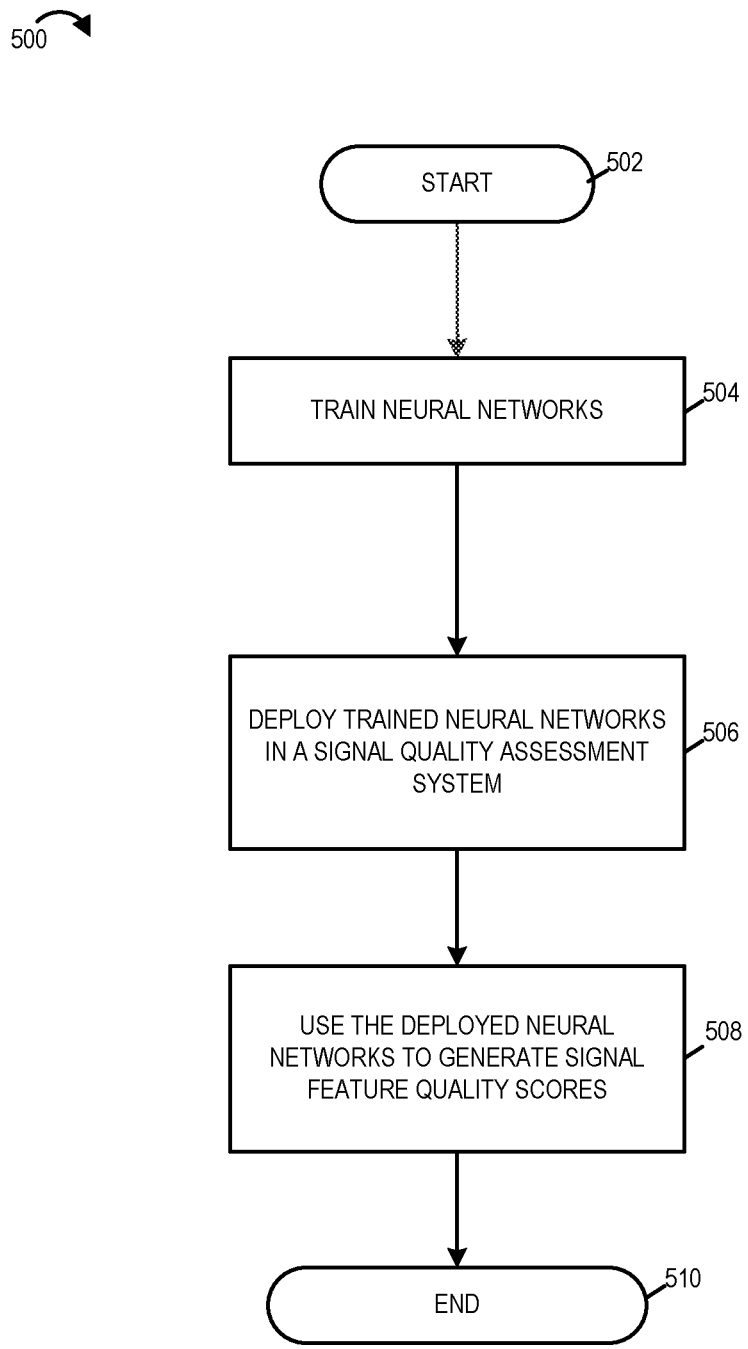
FIG. 5 is a flowchart illustrating a method of measuring the quality of a signal, e.g., a speech signal, in accordance with some embodiments of the present invention.

FIG. 5 is a flowchart 500 illustrating the steps of an exemplary method performed in accordance with some embodiments of the invention. Operation starts in step 502 and proceeds to step 504. In step 504 one or more neural networks are trained in accordance with the features of the invention. An exemplary neural network training subroutine illustrating the details of an exemplary neural network training method is shown in FIG. 6 and discussed later.

Operation proceeds from step 504 to step 506. In step 506 the trained neural networks are deployed in a signal quality assessment system. Operation proceeds from deployment step 506 to step 508. In step 508 the deployed trained neural networks are used to process speech signal recovered from packets communicated via a communication network to generate signal feature quality scores in accordance with the invention. The operation proceeds from step 508 to step 510 where process ends.

Figure 6:
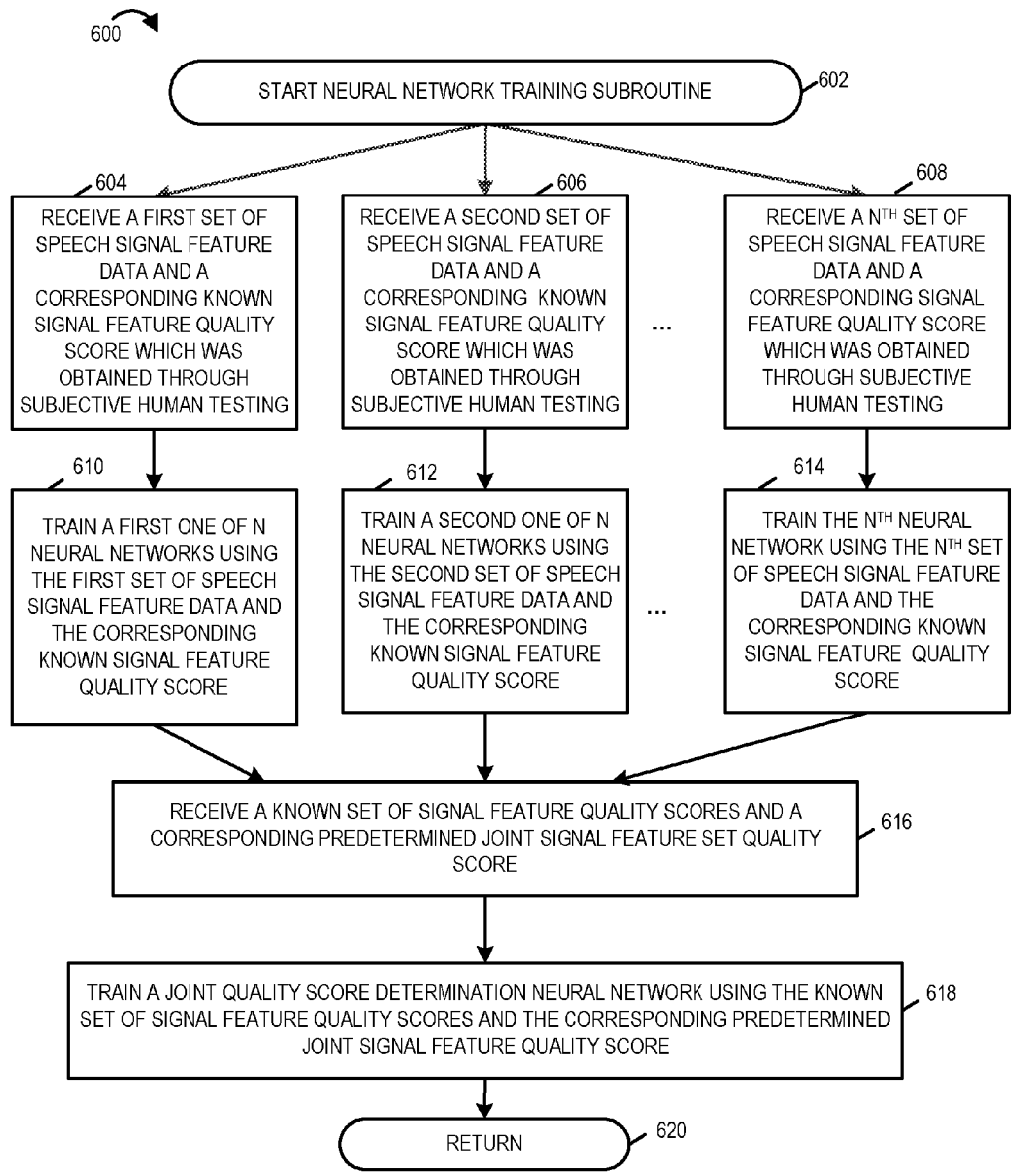
FIG. 6 is a flowchart illustrating the steps of an exemplary neural network training method implemented in accordance with the invention.

FIG. 6 is a flowchart 600 illustrating the steps of an exemplary neural network training subroutine implemented in accordance with the invention. The exemplary neural network training subroutine may be implemented by a neural network system such as the neural network scoring system 212, e.g., prior to deployment and use in a signal quality assessment system.

Operation starts in step 602 where the subroutine is executed. Operation proceeds from step 602 to steps 604, 606 and 608 which may be performed in parallel.

In step 604 a first set of speech signal feature data and a corresponding known signal feature quality score which were obtained through subjective human testing is received. The set of speech signal feature data and the corresponding set of known signal feature quality scores, in some embodiments, is included. e.g., in a labeled database of speech signals including e.g., speech signal feature measurement values which are used as inputs for training a neural network and a corresponding signal feature quality score which is used as the corresponding known output for training the neural network. Operation proceeds from step 604 to step 610. In step 610 a first one of N neural networks, e.g., neural network 1 308 of neural networks (308, 310, . . . 312), is trained using the first set of speech signal feature data and the corresponding known signal feature quality score. Such databases including a set of signal feature data input values and a corresponding signal feature quality score output value are available for training of neural networks. Operation proceeds from step 610 to step 616.

Referring now to step 606. In step 606 a second set of speech signal feature data and a corresponding known signal feature quality score which was obtained through subjective human testing is received. The second set of speech signal feature data and the corresponding known signal feature quality score corresponds to e.g., a set input values for a second signal feature of the speech signal and a corresponding signal feature quality score output value. Operation proceeds from step 606 to step 612. In step 612 a second one of the N neural networks, e.g. neural network 2 310, is trained using the second set of speech signal feature data and the corresponding known signal feature quality score. Operation proceeds from step 612 to step 616.

In a similar manner, each one of the plurality of N neural networks is trained using a set of speech signal feature data and a corresponding known signal feature quality score. In step 608 a Nth set of speech signal feature data and a corresponding known signal feature quality score which was obtained through subjective human testing is received. The Nth set of speech signal feature data and the corresponding known signal feature quality score corresponds to e.g., input values for a Nth signal feature of the speech signal and a corresponding signal feature quality score output value. Operation proceeds from step 608 to step 614. In step 614 the Nth. e.g., neural network N 312, is trained using the Nth set of speech signal feature data and the corresponding known signal feature quality score. In one exemplary embodiments, N=5. Operation proceeds from step 614 to step 616.

Referring now to step 616, in step 616 a known set of signal feature quality scores, e.g. signal feature quality scores output by the N neural networks, and a corresponding predetermined joint signal feature quality score is received. In accordance with one aspect of some embodiments, this received set of signal feature quality scores and corresponding predetermined joint signal feature quality score is used to train a joint signal feature score determination neural network, e.g., joint quality score determination module 314. Thus in some embodiments, signal feature quality scores outputs from the N neural networks is used as inputs for training the joint signal feature quality score determination network 314 while a corresponding known predetermined joint signal feature quality score is used as a corresponding output for training. In some embodiments, the predetermined joint quality scores are generated from ITU (International Telecommunication Union) Perceptual Evaluation of Speech Quality test P.563. In some embodiments, the predetermined joint quality scores are generated from a subjective database, e.g., a database of signals with known scores. In some embodiments, the predetermined joint quality scores are generated from a combination of ITU (International Telecommunication Union) Perceptual Evaluation of Speech Quality test P.563 and a subjective database. The use of the P.563 test for generating predetermined quality scores allows for generating scores for speech signals beyond those which can be obtained from a commercially available database of subjectively scored speech samples. Thus, by using the P563 scoring method to score a wide range of speech signals and then use the scored speech signals and scores as training data for one or more neural networks, a much richer set of training data can be generated and used than would be the case if training were limited to subjectively scored data. By using subjectively scored training data along with P.563 scored training data to train the one or more neural networks a robust system capable of accurately scoring a large variety of speech and/or other acoustic signals can be achieved in accordance with the invention. However, training based on a particular set of data or data scored in a particular way is not critical and a variety of training methods/training sets of data may be used.

Operation proceeds from step 616 to step 618. In step 618 the joint signal feature score determination neural network is trained using the known set of signal feature quality scores and the corresponding predetermined joint signal feature quality score.

It should be appreciated that multiple sets of: (i) a set of speech signal feature data and (ii) a corresponding known signal feature quality score which was obtained through subjective human testing, may be received corresponding to a neural network corresponding to a signal feature, and the neural network, corresponding to the signal feature, may be, and sometimes is, trained using the received information. Steps (604, 610) may be repeated for different sets of training data. Steps (606, 612) may be repeated for different sets of training data. Steps (608, 614) may be repeated for different sets of training data.

It should be appreciated that different known sets of signal feature quality scores, each with a corresponding predetermined joint signal feature quality score may be received, and the joint quality score determination neural network may be trained using that received information. Thus steps 616 and 618 may be performed multiple times corresponding to different training information.

In some embodiments various steps may be performed iteratively for training the neural networks. In various embodiments a trained set of neural networks and a trained joint signal feature score determination neural network is deployed and used in a signal quality assessment system used for performing speech signal quality assessment.

Figures 7, 7A:
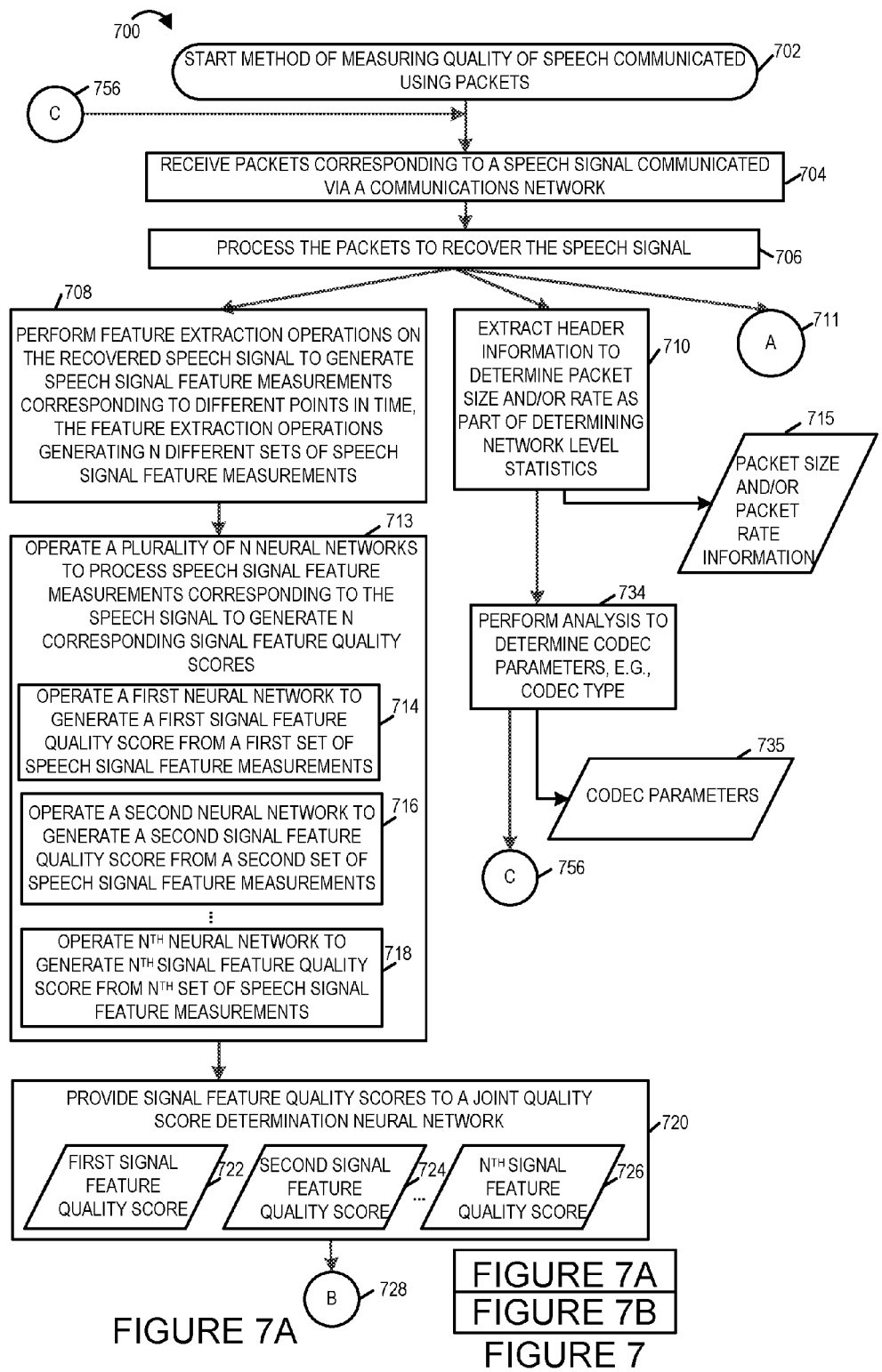
FIG. 7A is a first part of a flowchart illustrating the steps of an exemplary method of measuring the quality of a signal, e.g., speech signal, communicated using packets, in accordance with an embodiment of the invention.
Figure 7B:
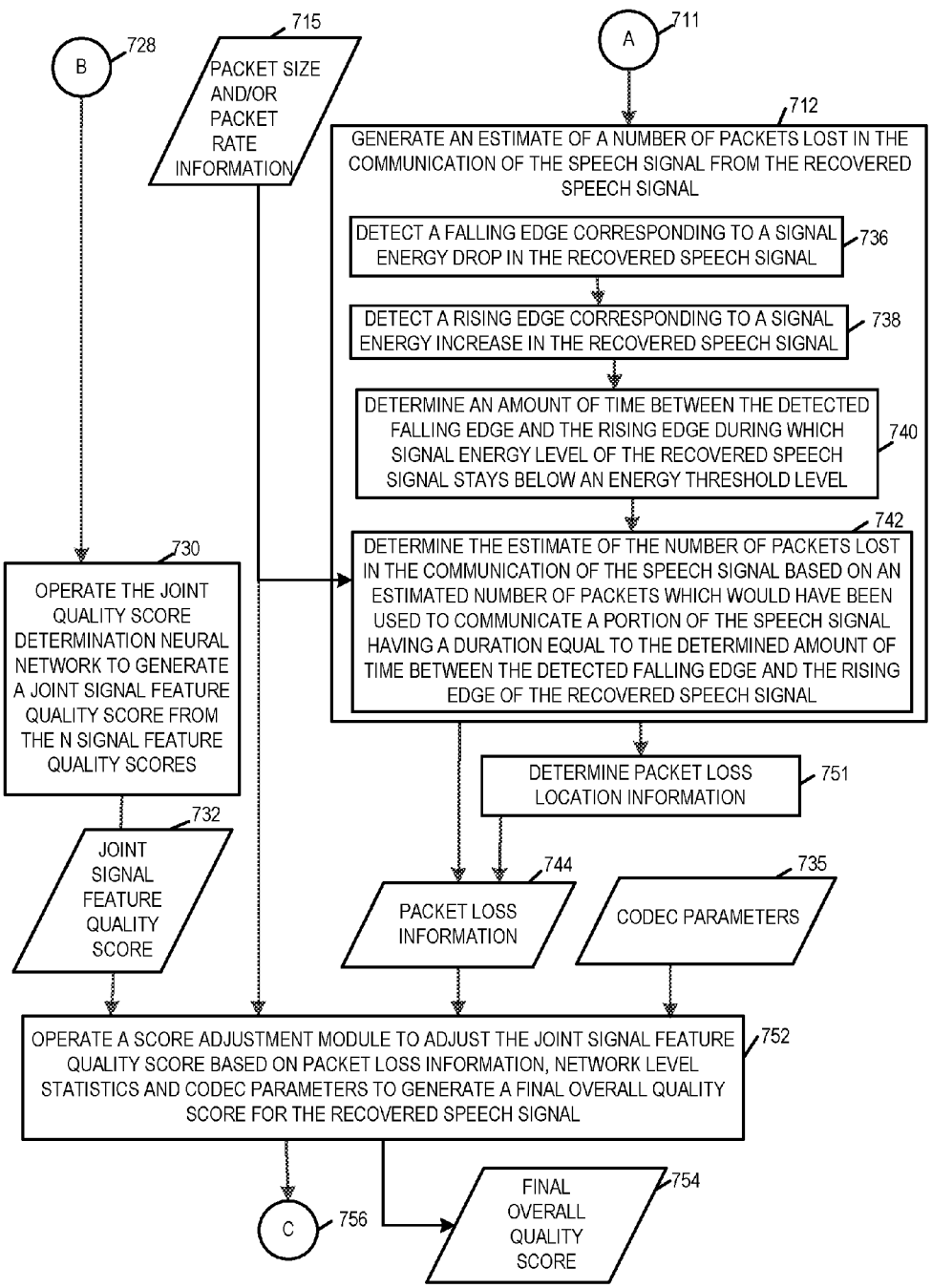
FIG. 7B is a second part of a flowchart illustrating the steps of an exemplary method of measuring the quality of a signal, e.g., speech signal, communicated using packets, in accordance with an embodiment of the invention.

FIG. 7, comprising the combination of FIG. 7A and FIG. 7B, is a flowchart 700 illustrating the steps of an exemplary method of measuring the quality of a signal, e.g., the quality of a speech signal, communicated using packets, in accordance with various embodiments of the invention. The exemplary method of flowchart 700 may be, and in some embodiments is, implemented by a signal quality assessment system such as the exemplary system 200 of FIG. 2.

Operation starts in step 702 where the system is initialized. Operation proceeds from step 702 to step 704. In step 704 packets corresponding to a speech signal communicated via a communications network are received. For example, the received packets may correspond to a portion of a communicated speech signal of a given duration, e.g., 10 seconds. Operation proceeds from step 704 to step 706. In step 706 the received packets are processed to recover the communicated speech signal. In various embodiments a sufficient number of packets is obtained and processed so that the corresponding recovered portion of speech signal is enough to ensure that various signal features can be reliably extracted and statistical consistency of the signal features can be ensured. Operation proceeds from step 706 to steps 708, 710 and 712 (via connecting node 711) which are performed independently in parallel in some embodiments.

First, referring to step 708 and the steps along that processing path, in step 708 the recovered speech signal is analyzed, and a set of signal features are extracted, e.g., by module 210. Thus feature extraction operations are performed on the recovered speech signal to generate speech signal feature measurements corresponding to different points in time, the feature extraction operations generating N different sets of speech signal feature measurements. An example illustrating N different sets of signal feature measurements is shown in FIG. 3 and was discussed earlier. Operation proceeds from step 708 to step 713.

In step 713 a plurality of deployed N neural networks is operated to process the speech signal feature measurements that are supplied to the N neural networks. Each of the N neural networks processes one of the N sets of speech signal feature measurements corresponding to the recovered speech signal to generate from the processed set of speech signal feature measurements a signal feature quality score, each of the N different neural networks corresponding to a different one of the N sets of speech signal feature measurements. The N neural networks generate N signal feature quality scores, with each one of the N signal feature quality scores corresponding to a different one of the N speech signal features. In some embodiments the plurality of N neural networks includes at least a first neural network corresponding to a first speech signal feature and a second neural network corresponding to a second speech signal feature. That is, a first neural network corresponds to and processes signal feature measurements for a first speech signal feature and a second neural network corresponds to and processes signal feature measurements for a second speech signal feature.

In various embodiments the N sets of speech feature signal measurements include a first set of speech signal feature measurements, e.g., set 302, generated from the recovered speech signal and a second set of speech signal feature measurements, e.g., set 304, generated from the recovered speech signal. In some embodiments the N sets of speech signal feature measurements include as least two sets of speech signal measurements from a group of sets of speech signal feature measurements including: a set of signal to noise ratio measurements; a set of spectral clarity measurements; a set of linear prediction skew measurements; a set of linear prediction kurtosis measurements and a set of pitch average measurements. In some embodiments N=5. In some such embodiments the N sets of speech signaling measurements are: a set of signal to noise ratio measurements; a set of spectral clarity measurements; a set of linear prediction skew measurements; a set of linear prediction kurtosis measurements and a set of pitch average measurements.

In some embodiments the step 713 of operating the plurality of N neural networks includes one or more of steps 714, 716 and 718. In step 714 the first neural network is operated to generate a first signal feature quality score from the first set of speech signal feature measurements. In step 716 the second neural network is operated to generate a second signal feature quality score from the second set of speech signal feature measurements. Similarly in some embodiments other neural networks in the plurality of N neural networks are operated to generate corresponding signal feature quality score. In step 718 the Nth neural network is operated to generate Nth signal feature quality score from Nth set of speech signal feature measurements. Thus in some embodiments N signal feature quality score are generated as outputs. In some embodiments N=5, thus 5 different signal features are extracted and 5 sets of signal feature measurements are generated. In some embodiments the N sets of speech signal feature measurements include speech signal measurements from the group of five sets of speech signal feature measurements including: i) a set of signal to noise ratio measurements; ii) a set of spectral clarity measurements; iii) a set of linear prediction skew measurements; iv) a set of linear prediction kurtosis measurements and v) a set of pitch average measurements.

Operation proceeds from step 713 to step 720. The output signal feature quality score from each of the N neural networks is provided to a joint score determination neural network, e.g., such as the joint score determination neural network 314 as shown in FIG. 3, in step 720. The output signal feature quality scores include a first signal feature quality score 722, second signal feature quality score 724, . . . , and Nth signal feature quality score 726. Operation proceeds from step 720, via connecting node B 728, to step 730. In step 730 the joint signal feature quality score determination neural network is operated to generate a joint signal feature quality score from the N speech signal feature quality scores received as inputs. The generated joint signal feature quality score is represented in FIG. 7B by data 732 which is the output of the joint signal feature quality score determination neural network. In accordance with various embodiments the generated joint signal feature quality score 732 is provided to a score adjustment module which performs further processing in accordance with the features of the invention. Operation proceeds from step 730 to step 752. As illustrated in FIG. 7B the output data 732 serves as an input to step 752.

Returning to step 710, in step 710 the packets are analyzed to extract packet header information to determine packet size and/or packet rate, as part of determining network level statistics. In some embodiments this operation is performed by, e.g., the packet header analysis module 202. The packet size and/or packet rate information is used to derive a time interval corresponding to a packet, e.g., in milliseconds. This time interval information may be, and in some embodiments is, used in determining an estimate of the lost packets. The output of step 710 is the determined packet size and/or packet rate information 715 which is provided as an input to a step for determining an estimate of the number of lost packets as discussed later.

Operation proceeds from step 710 to step 734. In step 734 the packets are analyzed to determine codec parameters, e.g., such as codec type, coding scheme, codec robustness to packet loss etc. In some embodiments, step 734 is performed by packet decoding module 202. The output of step 734 is the determined codec parameters information 735 which is used as an input by the score adjustment module to adjust the signal feature quality as discussed later. Operation proceeds from step 710 back to step 704 via connecting node C 756.

Referring now to step 712, shown in FIG. 7B, and the steps along that processing path, in step 712 the system generates, from the recovered speech signal, an estimate of the number of packets lost in the communication of the speech signal. In some embodiments, the step of generating an estimate of the number of lost packets includes performing steps 736, 738, 740 and 742. As part of determining the estimate of the number of lost packets, in step 736 the system analyzes the recovered signal energy profile to detect a falling edge corresponding to a signal energy drop in the recovered speech signal. Operation proceeds from step 736 to step 738. In step 738 the system analyzes the recovered signal energy profile to detect a rising edge corresponding to a signal energy increase in the recovered speech signal. Operation proceeds from step 738 to step 740. In step 740 an amount of time between the detected falling edge and the detected rising edge, during which the signal energy level of the recovered speech signal stays below an energy threshold level, is determined. In some embodiments the functions corresponding to the steps 736, 738 and 740 are performed by the edge based time gap detection module 220 shown in FIG. 2. The determined amount of time information, output from step 740, is provided as an input to step 742 which also receives the packet size and/or packet rate information 715 as an input. In step 742 the estimate of the number of packets lost in the communication of the speech signal is determined based on an estimated number of packets which would have been used to communicate a portion of the speech signal having a duration equal to the determined amount of time between the detected falling edge of the recovered speech signal and the detected rising edge of the recovered speech signal. In some embodiments the function corresponding to step 742 is performed, e.g., by the lost packet estimator 222, based on the inputs, e.g., the determined amount of time information and the packet size and/or packet rate information 715. The output of step 712 is packet loss information 744 that includes an estimate of the number of packets lost in the communication of the speech signal via the communications network. In some embodiments, operation proceeds from step 712 to step 751 in which packet loss location information is determined. In some embodiments, the packet loss information is further included packet loss information 744. Operation proceeds from step 712 (including steps 736, 738, 740 and 742) to step 752.

Following the determination of various parameters and other information that is used in adjusting the joint quality score, in step 752 the score adjustment module, e.g., module 214, is operated to adjust the joint quality score 732 received by the score adjustment module based on packet loss information 744 and codec parameters 735 to generate a final overall quality score 754 for the recovered speech signal. In some embodiments the packet loss information 744 includes an estimate of the number of packets lost. In some embodiments, the packet loss information includes packet loss location information, e.g., information indicating the temporal location within the signal or call being analyzed in which the packets were lost, e.g., beginning, middle or end of signal or call. In some embodiments, the score adjustment module adjusts the joint signal feature quality score based on codec type and/or location of lost packets in a call. For example, lost packets detected at the end of the call may have a greater impact than lost packets at the beginning of a call on perceived call quality since the information communicated at the end of a call is often more important then information communicated at the beginning of the call. The quality score may, and in some embodiments is, adjusted differently based on where the lost packets which were detected were located in the call. For example, a joint features signal quality score may be lowered more when a given number of packets are lost at the end of a call then when the same number of packets are lost at the beginning of a call.

In some embodiments, different types of codecs correspond to different packet loss robustness factors. The packet loss factors may be predetermined based on how well a particular codec (coder/decoder combination) can handle and/or tolerate packet loss. A codec which can handle packet loss very well, e.g., due to a high level of error correcting coding and/or redundancy, will have a packet loss factor which lowers a quality score less than the packet loss factor for a codec which handles packet loss poorly assuming a higher quality score indicates a better quality signal. In various embodiments the final overall quality score is calculated by the score adjustment module, e.g., module 214, in accordance with equations (1), (2), (3) and (4) discussed earlier with regard to adjustment module 214 of FIG. 2. In various embodiments the adjusted final quality score 754 is an approximation of a MOS score adjusted to take into consideration packet loss corresponding to signal portions which indicate non-silent signal portions. The output 754, which is the final overall signal feature quality score, can be stored in the signal quality assessment system, e.g., system 200, and/or transmitted to an external device/server. Operation proceeds from step 752, via connecting node C 756 back to step 704 and may continue in a similar manner.

Figure 8:
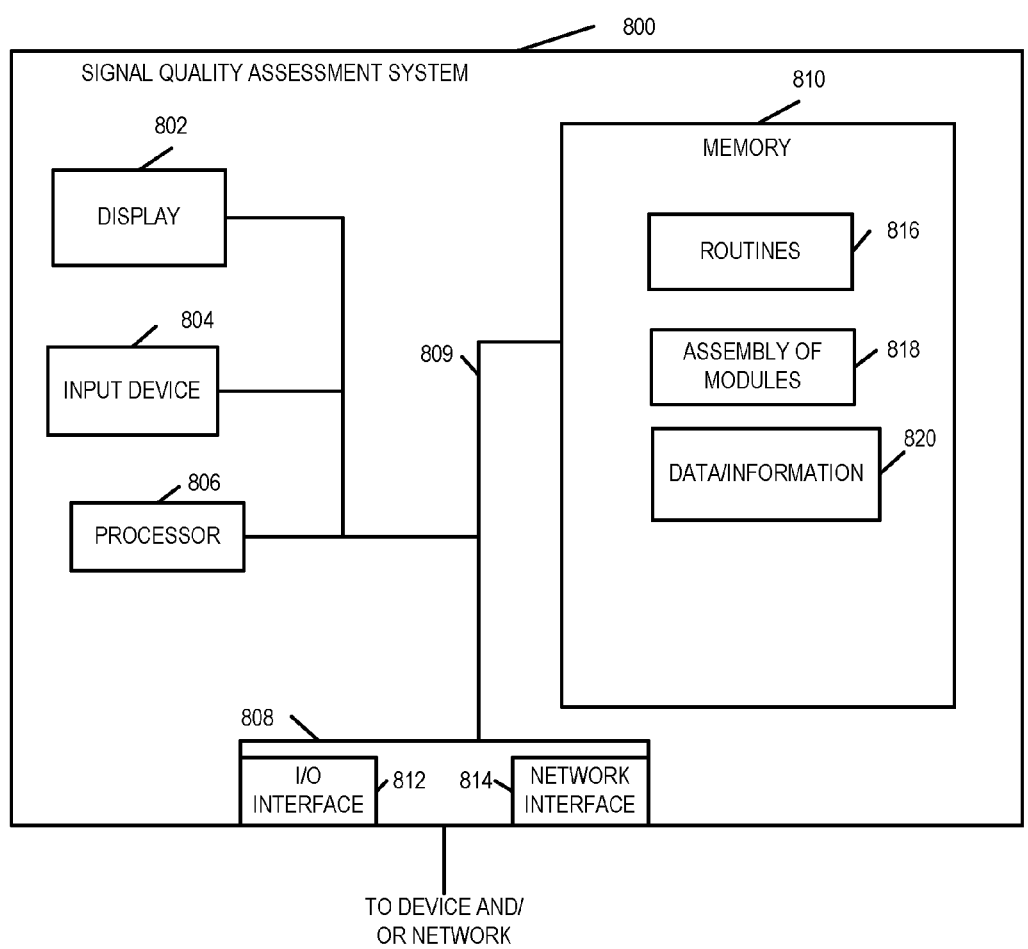
FIG. 8 illustrates an exemplary apparatus, e.g., a signal quality assessment system, capable of implementing methods of the present invention, in accordance with various embodiments.

FIG. 8 illustrates an exemplary apparatus, e.g., a signal quality assessment system, capable of implementing methods of the present invention, in accordance with various embodiments. The system 800 includes various modules for performing the steps of methods of the present invention, e.g., such as the methods of flowchart 500 of FIG. 5, of flowchart 600 FIG. 6, and/or flowchart 700 of FIG. 7.

As shown in FIG. 8, the system 800 includes a display 802, an input device 804, a processor 806, an interface 808 and a memory 810 coupled together by a bus 809 over which the various elements may exchange data and information.

The display 802 can be used to display, e.g., an image, signal energy profile graph and/or other generated signal processing results, etc., in accordance with the invention and for displaying one or more control screens which may display control information, e.g., user selected control parameters and information. The input device 804 includes, e.g., a keyboard, microphone, camera and/or other input device and can be used to provide input to the system 800. The user can, and in some embodiments does, input control parameters using the input device 804.

The processor 806 performs various operations in accordance with the invention, e.g., under direction of routines 816 and/or one or more of the modules stored in the assembly of modules 818 stored in the memory 810.

The interface 808 includes an I/O interface 812 and a network interface 814 both of which include a transmitter and a receiver for transmitting and receiving information respectively. In some embodiments the speech signal communicated using packets is received via the interface 808.

The memory 810 includes routines 816, an assembly of modules 818 and data/information 820. In some embodiments the routines 816 include communications routines and control routines for controlling the operation of the device in accordance with the invention. In some embodiments, each of the modules in the assembly of modules 818 is included in with routines 816. Routines 816 includes, e.g., main routines and subroutines. In some embodiments the neural network training subroutine 600 is included in the routines 816. Thus when executed by the processor 806, the neural network training subroutine 600 controls the system 800 to implement the functions corresponding to the steps illustrated in FIG. 6, e.g., to train neural networks used in the system 800.

While the assembly of modules 818 includes various software modules, the modules may and in some embodiments are, implemented in hardware. In some embodiments, some modules in the assembly of modules 818 are implemented in hardware and other modules in the assembly of modules 818 are implemented in software. In some embodiments, some or all of assembly of modules 818 are included within signal quality assessment system 800 outside of memory 810.

The stored data/information 820 in memory 810 includes received packets communicating the speech signal to be processed, speech signal recovered after processing received packets, received control parameters, derived parameters including the packet size and/or packet rate, packet loss information, encoder parameters, codec parameters, processing results, e.g., generated signal feature quality scores, joint signal feature quality score, final signal feature quality score and/or other related information, etc. The final signal quality score which is an output at the completion of processing performed in accordance with the methods of the invention is also stored as part of data/information 820.

Figures 9, 9A:
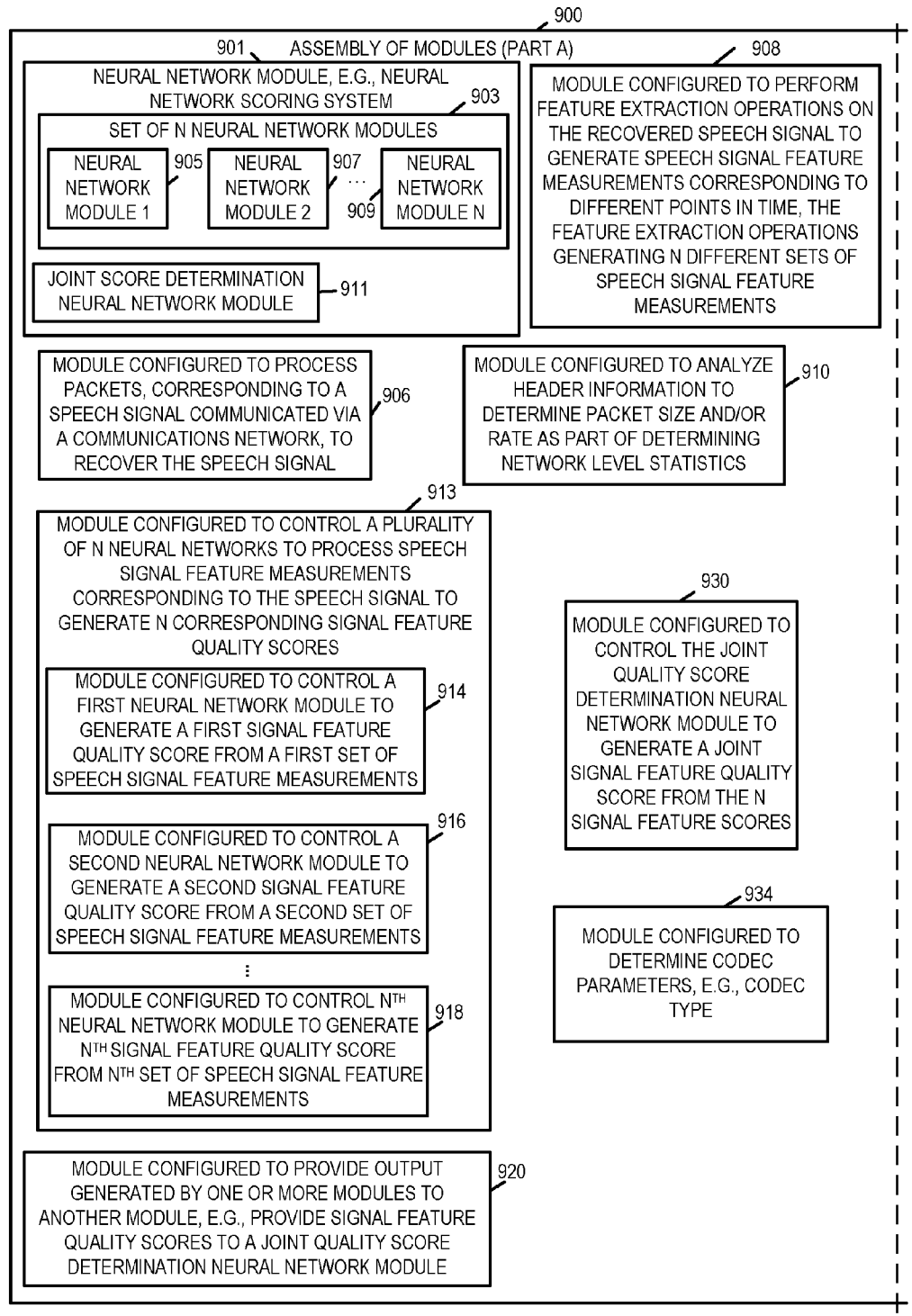
FIG. 9A illustrates a first part of an assembly of modules which can, and in some embodiments is, used in the exemplary system illustrated in FIG. 8.
Figure 9B:
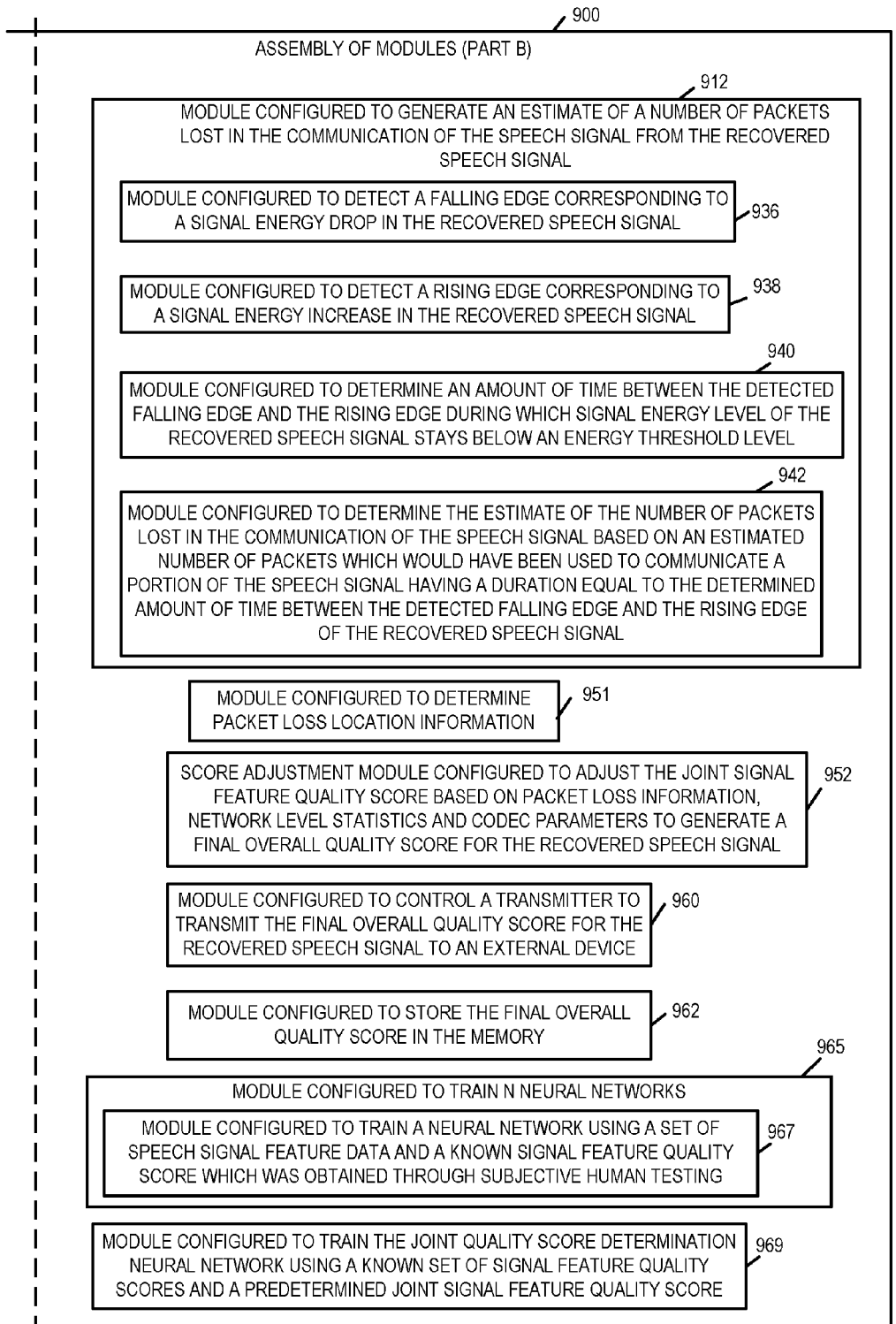
FIG. 9B illustrates a second part of an assembly of modules which can, and in some embodiments is, used in the exemplary system illustrated in FIG. 8.

FIG. 9, which comprises a combination of FIGS. 9A and 9B, illustrates an assembly of modules 900 which can, and in some embodiments is, used in the exemplary system 800 illustrated in FIG. 8. In some embodiments, assembly of modules 900 is assembly of modules 818 in system 800 in FIG. 8. FIG. 9A illustrates a first part of the assembly of modules 900 while FIG. 9B illustrates a second part of the assembly of modules 900.

In some embodiments the assembly of modules 900 can be implemented in hardware within the processor 806 of the system 800, e.g., as individual circuits. The modules in the assembly 900 can, and in some embodiments are, implemented fully in hardware within the processor 806, e.g., as individual circuits. In other embodiments some of the modules are implemented, e.g., as circuits, within the processor 806 with other modules being implemented, e.g., as circuits, external to and coupled to the processor. As should be appreciated the level of integration of modules on the processor and/or with some modules being external to the processor may be one of design choice. An exemplary hardware implementation of modules is illustrated in FIG. 2.

Alternatively, rather than being implemented as circuits, all or some of the modules may be implemented in software and stored in the memory 810 of the system 800, with the modules controlling operation of system 800 to implement the functions corresponding to the modules when the modules are executed by a processor, e.g., processor 806. In some such embodiments, the assembly of modules 900 is included in the memory 810. In still other embodiments, various modules are implemented as a combination of hardware and software, e.g., with another circuit external to the processor providing input to the processor 806 which then under software control operates to perform a portion of a module's function. While shown in the FIG. 8 embodiment as a single processor, e.g., computer, it should be appreciated that the processor 806 may be implemented as one or more processors, e.g., computers.

When implemented in software the modules include code, which when executed by the processor 806, configure the processor 806 to implement the function corresponding to the module. In embodiments where the assembly of modules 900 is stored in the memory 810, the memory 810 is a computer program product comprising a computer readable medium comprising code, e.g., individual code for each module, for causing at least one computer, e.g., processor 806, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 9 control and/or configure the system 800 or elements therein such as the processor 806, to perform the functions of the corresponding steps illustrated in the method flowchart 700 of FIG. 7. Thus the assembly of modules 900 includes various modules that perform functions of the corresponding steps of the method shown in FIG. 7.

As illustrated in FIG. 9, the assembly of modules 900 includes a neural network module 901, e.g., a neural network scoring system, including a set of N neural network modules 903 (neural network module 1 905, neural network module 2 907, . . . , neural network module N 909) and a joint quality score determination neural network module 911, a module 906 configured to process received packets corresponding to a speech signal, communicated via a communications network, to recover the speech signal, and a module 908 configured to analyze the recovered speech signal and perform signal feature extraction operations on the recovered speech signal to generate speech signal feature measurements corresponding to different points in time, the feature extraction operations generating N different sets of speech signal feature measurements. The set of N neural network modules 903 is configured to process the speech signal feature to generate N signal feature quality scores while the joint quality score determination neural network module 911 is configured to generate a joint signal feature quality score. In various embodiments the N sets of generated speech feature signal measurements include a first set of speech signal feature measurements and a second set of speech signal feature measurements generated from the recovered speech signal. In some embodiments the N sets of speech signal feature measurements include as least two sets of speech signal measurements from a group of sets of speech signal feature measurements including: a set of signal to noise ratio measurements; a set of spectral clarity measurements; a set of linear prediction skew measurements; a set of linear prediction kurtosis measurements and a set of pitch average measurements. In some embodiments, N=5, and the 5 sets of speech signal feature measurements are: a set of signal to noise ratio measurements; a set of spectral clarity measurements; a set of linear prediction skew measurements; a set of linear prediction kurtosis measurements, and a set of pitch average measurements.

Assembly of modules 900 further includes a module 910 configured to analyze packet header information to determine packet size and/or packet rate, as part of determining network level statistics, a module 912 configured to generate from the recovered speech signal an estimate of the number of packets lost in the communication of the speech signal from the recovered speech signal, a module 951 configured to determine packet loss location information, a module 913 configured to control a plurality of N neural network modules 903 to process the speech signal feature measurements to generate N corresponding signal features quality scores, each of the N neural network modules processing one of the N sets of speech signal feature measurements corresponding to the recovered speech signal to generate from the processed set of speech signal feature measurements a signal feature quality score, each of the N different neural network modules corresponding to a different one of the N sets of speech signal feature measurements, and a module 920 configured to provide output generated by one or more modules (905, 907, . . . , 909) in the assembly 903 to another module or modules in the system 800, e.g., to joint score determination neural network module 911. In some embodiments the set 903 of N neural network modules includes at least a first neural network module corresponding to a first speech signal feature and a second neural network module corresponding to a second speech signal feature. In some embodiments, the set of N neural network modules includes 5 modules corresponding to five different speech signal features. In some embodiments the module 913 includes a module 914 configured to control a first neural network module in the set of modules 903 to generate a first signal feature quality score from the first set of speech signal feature measurements, a module 916 configured to control a second neural network module to generate a second signal feature quality score from the second set of speech signal feature measurements, . . . , and a module 918 configured to control an Nth neural network module in the set of modules 903 to generate Nth signal feature quality score from Nth set of speech signal feature measurements. The output signal feature quality scores from the module 913 include a first signal feature quality score 722, second signal feature quality score 724, . . . , and Nth signal feature quality score 726. In some embodiments the module 920 provides output generated by each of the N neural network modules (905, 907, . . . , 909) to the joint quality score determination module 911.

In various embodiments the assembly of modules 900 further includes a module 930 configured to control the joint quality score determination module 905 to generate a joint signal feature quality score from N signal feature scores, and a module 934 configured to determine codec/encoder parameters e.g., such as codec type, coding scheme, codec robustness to packet loss, etc. In various embodiments the module 912 includes a module 936 configured to detect a falling edge corresponding to a signal energy drop in the recovered speech signal, a module 938 configured to detect a rising edge corresponding to a signal energy increase in the recovered speech signal, a module 940 configured to determine an amount of time between the detected falling edge and the detected rising edge, during which the signal energy level of the recovered speech signal stays below an energy threshold level, and a module 942 configured to determine the estimate of the number of packets lost in the communication of the speech signal based on an estimated number of packets which would have been used to communicate a portion of the speech signal having a duration equal to the determined amount of time between the detected falling edge of the recovered speech signal and the detected rising edge of the recovered speech signal. In some embodiments the modules 936, 938 and 940 are implemented as a single module for analyzing speech signal energy profile. In various embodiments the module 942 is configured to make the determination based on different inputs, e.g., the determined amount of time information output by module 940 and the packet size and/or packet rate information output by module 910. Thus module 912 generates and output packet loss information that includes an estimate of the number of packets lost in the communication of the speech signal via the communications network.

The assembly of modules 900 further includes a score adjustment module 952 configured to adjust the joint quality score based on packet loss information, network level statistics, and codec parameters to generate a final overall signal quality score for the recovered speech signal, a module 960 configured to control a transmitter, e.g., included in interface 908, to transmit the final overall signal quality score to an external device, and a module 962 configured to store the final overall signal quality score, e.g., in memory 810. In various embodiments the final score is calculated by the adjustment module 952 in accordance with equations (1), (2), (3) and (4) discussed earlier with regard to score adjustment module 214 of FIG. 2. In some embodiments the adjusted final quality score is an approximation of a MOS score adjusted to take into consideration packet loss corresponding to signal portions which indicate non-silent signal portions.

Assembly of module 900 further includes a module 965 configured to train N neural networks and a module 969 configured to train the joint quality score determination neural network using a known set of signal feature quality scores and a predetermined joint signal feature quality score. Module 965 includes a module 967 configured to train a neural network using a set of speech signal feature data and a known signal feature quality score which was obtained through subjective human testing.

In some embodiments, one or more modules shown in FIG. 9 which are included within another module may be implemented as an independent module or modules.

Figure 10:
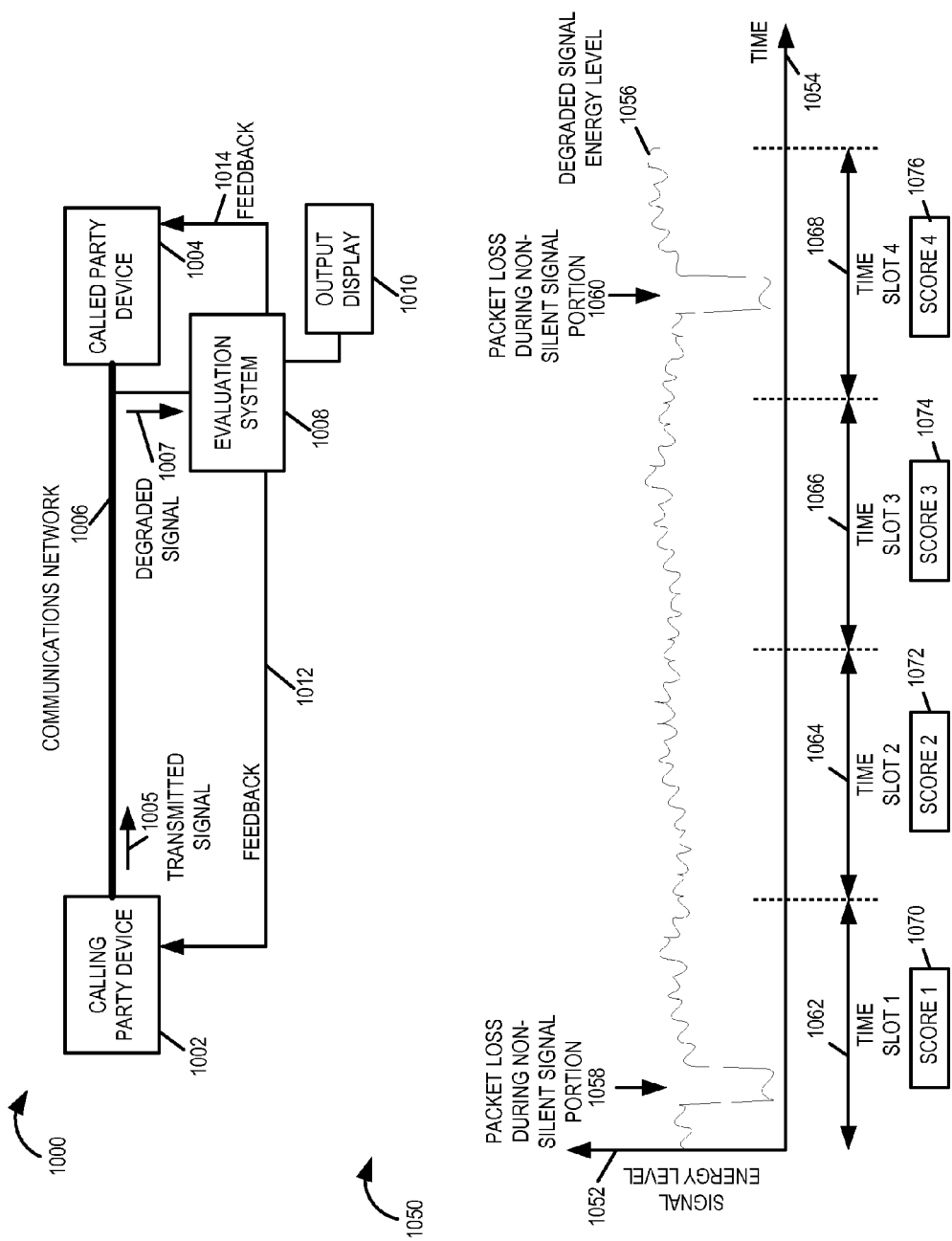
FIG. 10 illustrates an exemplary communications system including a signal quality evaluation system with feedback, an exemplary degraded signal including exemplary packet loss during non-silent portions, and time slot based signal quality assessments in accordance with an exemplary embodiment.

Drawing 1000 of FIG. 10 illustrates an exemplary calling party device 1002 coupled to an exemplary called party device 1004 by a communications network 1006. An evaluation system 1008 is coupled to the communications network 1006 in the vicinity of the called party device. The calling party device generates a transmitted signal 1005, and a degraded signal 1007, corresponding to the transmitted signal 1005, is received and processed by the evaluation system 1008. The evaluation system 1008 is, e.g., signal quality assessment system 200 of FIG. 2, and/or signal quality assessment system 800 of FIG. 8 and/or an evaluation system implementing a method in accordance with the flowcharts of FIGS. 5, 6, and 7, and/or a signal quality assessment system including the assembly of modules 900 of FIG. 9.

In this exemplary embodiment, the evaluation system 1008 generates and sends feedback information (1012, 1014) to devices (1002, 1004), respectively, based on one or more determined final adjusted scores. The feedback information (1012, 1014) includes, e.g., control information such as encoding and/or decoding parameters, codec parameters, information selecting a particular codec, packet size information, and/or packet rate information. The feedback information is used to adjust, control and/or modify encoding and/or packetization in accordance with or based on the feedback information in an attempt to improve and/or maintain the signal quality of the communicated signal, e.g., as it will be perceived by the end listener to which the signal is being communicated. In some embodiments, feedback information is communicated during an ongoing call, e.g., with adjustments being performed in real time or near real time. In some other embodiments, the feedback information is communicated after a completed call. In various embodiments, a detected packet loss during a non-silent period is weighted differently as a function of the location of the packet loss within the call, e.g., a packet loss at a beginning of a call has less of a negative impact than packet losses near the end of a call with regard to a determined final adjusted score.

Drawing 1050 of FIG. 10 illustrates a plot of signal energy level 1056 corresponding to a degraded signal such as exemplary degraded signal 1007. Vertical axis 1052 represents measured signal energy level while horizontal axis 1054 represents time. In this example, four exemplary time slots are shown (slot 1 1062, slot 2 1064, slot 3 1066, slot 4 1068). Evaluation system 1008 determines a final adjusted quality score corresponding to each time slot (score 1 1070, score 2 1072, score 3 1074, score 4 1076). Packet loss information is used in determining the final adjusted quality score for each slot. In this example, both the number of packets lost and the location of the packet loss are used as inputs in determining a final adjusted quality score for a slot. Consider that during slot 1 1062 and slot 4 1068, packet loss is detected during a non-silent signal portion (1058, 1060), e.g., based on the signal energy characteristics meeting certain criteria, e.g., level thresholds, transition thresholds, and time duration thresholds. Further consider that the number of packets determined to be lost during slot 1 is the same as the number packets determined to be lost during time slot 4. In this example, a packet loss that occurs during later interval slot in a call has a more negative impact on a quality score than an equivalent packet loss that occurs during an earlier time slot in the call. In this example, consider that score 3 is approximately equal to score 2; score 2 is greater than score 1; and score 1 is greater than score 4. In this example, the deciding factor as to why score 4 is less than score 1 is because of packet loss location information. In various embodiments, confidence values are also generated indicating confidence that a packet loss was observed at a location.

Various features of the embodiments of the present invention are novel and various approaches in accordance with the present invention are an order of magnitude faster than the known signal quality assessment approaches, as well as having comparable accuracy (e.g., correlation coefficient 0.98), as compared to known approaches. Some features of the methods of the present invention address one or more shortcomings in the previous system such as the ITU P.563 related to handling packet loss. Packet loss is the main source of quality degradation in VoIP networks. In the P.563 standard the packet loss is determined by counting sharp level drops in the signal, and then it applies the count toward the final MOS score output a the psycho-acoustic model. Clearly the approach used in the P.563 standard does not take in account consecutive packet loss as well as the codec robustness for packet losses. Such factors are considered for evaluating signal quality in various embodiments of the present invention and therefore the described features of various embodiments are both novel and better.

The techniques of various embodiments may be implemented using software, hardware and/or a combination of software and hardware. Various embodiments are directed to apparatus, e.g., signal analyzers, telecommunications systems, network nodes and/or network equipment devices. Various embodiments are also directed to methods, e.g., method of measuring quality of speech communicated using packets. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, packet reception, packet processing to recover signal, and/or other steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to an apparatus, e.g., a signal quality assessment apparatus, including a processor configured to implement one, multiple or all of the steps of one or more methods of the invention.

In some embodiments, the processor or processors, e.g., CPUs, of one or more devices, e.g., signal quality assessment apparatus, are configured to perform the steps of the methods described as being performed by the apparatus. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., such as a signal quality assessment apparatus, with a processor which includes a module corresponding to each of the steps of the various described methods performed by the device in which the processor is included. In some but not all embodiments an apparatus, e.g., signal quality assessment apparatus, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a signal quality assessment apparatus. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of measuring the quality of speech communicated using packets, the method comprising:

operating a plurality of N independent neural networks, each neural network processing one of N separate sets of speech signal feature measurements corresponding to a speech signal recovered from packets communicated via a communications network to generate from the processed set of speech signal feature measurements a signal feature quality score, each of the N different neural networks corresponding to a different one of the N sets of speech signal feature measurements, said N neural networks generating N signal feature quality scores, each one of the N signal feature quality scores corresponding to a different one of N speech signal features;

operating a joint quality score determination neural network to generate a joint signal feature quality score from said N signal feature quality scores;

adjusting said joint quality score based on packet loss information and codec type to generate a final overall quality score for said recovered speech signal wherein different types of codecs correspond to different packet loss robustness factors; and wherein said N sets of separate speech signal feature measurements include at least two sets of speech signal measurements from a group of sets of speech signal feature measurements including: a set of signal to noise ratio measurements, a set of spectral clarity measurements, a set of linear prediction skew measurements, a set of linear prediction kurtosis measurements and a set of pitch average measurements.

2. The method of claim 1, wherein said plurality of N neural networks includes at least a first neural network corresponding to a first speech signal feature and a second neural network corresponding to a second speech signal feature;

wherein said N sets of speech feature signal measurements include a first set of speech signal feature measurements generated from recovered speech signal and a second set of speech signal feature measurements generated from recovered speech signal the method further comprising:

wherein said operating a plurality of N neural networks includes:

operating the first neural network to generate a first signal feature quality score from the first set of speech signal feature measurements; and operating the second neural network to generate a second signal feature quality score from the second set of speech signal feature measurements.

3. The method of claim 2, wherein N is 5; and wherein said N sets of speech signal feature measurements include speech signal measurements from the group of five sets of speech signal feature measurements including: i) a set of signal to noise ratio measurements, ii) a set of spectral clarity measurements, iii) a set of linear prediction skew measurements, iv) a set of linear prediction kurtosis measurements and v) a set of pitch average measurements.

4. The method of claim 1, further comprising:
performing feature extraction operations on said recovered speech signal to generate speech signal feature measurements corresponding to different points in time, said feature extraction operations generating said N different sets of speech signal feature measurements.

5. The method of claim 1, wherein said adjusted joint quality score is an approximation of a MOS score (mean opinion score) adjusted to take into consideration packet loss corresponding to signal portions which are non-silent signal portions.

6. The method of claim 1, wherein said packet loss information includes an estimate of a number of packets lost in the communication of said speech signal via said communications network; and wherein said packet loss information includes packet loss location information.

7. The method of claim 6, further comprising:
receiving said packets communicated via the communications network;
processing said packets to recover said speech signal; and
generating the estimate of the number of packets lost in the communication of said speech signal from the recovered speech signal.

8. The method of claim 7, wherein generating the estimate of the number of packets lost in the communication of said speech signal includes:
detecting a falling edge corresponding to a signal energy drop in said recovered speech signal;
detecting a rising edge corresponding to a signal energy increase in said recovered speech signal; and
determining an amount of time between said detected falling edge and said detected rising edge during which the signal energy level of said recovered speech signal stays below an energy level threshold level.

9. The method of claim 8, wherein generating the estimate of the number of packets lost in the communication of said speech signal further includes:
determining the estimate of the number of packets lost in the communication of the speech signal based on an estimated number of packets which would have been used to communicate a portion of said speech signal having a duration equal to the determined amount of time between said detected falling edge of said recovered speech signal and said detected rising edge of said recovered speech signal.

10. The method of claim 1, further comprising:
prior to operating said N neural networks, training at least one of said N neural networks using a set of speech signal feature data and a corresponding known signal feature set quality score which was obtained through subjective human testing.

11. The method of claim 10, further comprising:
prior to operating said joint quality score determination neural network to generate a joint quality score, training said joint quality score determination neural network using a known set of signal feature quality scores and a corresponding predetermined joint signal feature set quality score.

12. The method of claim 11, wherein said predetermined joint quality scores are generated from ITU (International Telecommunication Union) Perceptual Evaluation of Speech Quality test P.563.

13. An apparatus for measuring the quality of speech communicated using packets, comprising:
a plurality of N independent neural networks, each neural network being configured to process one of N separate sets of speech signal feature measurements corresponding to a speech signal recovered from packets communicated via a communications network to generate from the processed set of speech signal feature measurements a signal feature quality score, each of the N different neural networks corresponding to a different one of the N sets of speech signal feature measurements, said N neural networks generating N signal feature quality scores, each one of the N signal feature quality scores corresponding to a different one of N speech signal features;
a joint quality score determination neural network configured to generate a joint signal feature quality score from said N signal feature quality scores;
a score adjustment module configured to adjust said joint quality score based on packet loss information and codec type to generate a final overall quality score for said recovered speech signal wherein different types of codecs correspond to different packet loss robustness factors; and
wherein said N sets of separate speech signal feature measurements include at least two sets of speech signal measurements from a group of sets of speech signal feature measurements including: a set of signal to noise ratio measurements, a set of spectral clarity measurements, a set of linear prediction skew measurements, a set of linear prediction kurtosis measurements and a set of pitch average measurements.

14. The apparatus of claim 13,
wherein said plurality of N neural networks includes at least a first neural network corresponding to a first speech signal feature and a second neural network corresponding to a second speech signal feature;
wherein said N sets of speech feature signal measurements include a first set of speech signal feature measurements generated from recovered speech signal and a second set of speech signal feature measurements generated from recovered speech signal; and
wherein said first neural network is configured to generate a first signal feature quality score from the first set of speech signal feature measurements, and said second neural network is configured to generate a second signal feature quality score from the second set of speech signal feature measurements.

15. The apparatus of claim 13, further comprising:
a feature extraction module configured to perform feature extraction operations on said recovered speech signal to generate speech signal feature measurements corresponding to different points in time, said feature extraction module generating said N different sets of speech signal feature measurements.

16. The apparatus of claim 13, wherein said adjusted joint quality score is an approximation of a MOS score (mean opinion score) adjusted to take into consideration packet loss corresponding to signal portions which are non-silent signal portions.

17. The apparatus of claim 13, further comprising:
an interface including a receiver configured to receive said packets communicated via the communications network;
a processing module configure to process said packets to recover said speech signal; and a packet loss estimate generation module configured to generate, from the recovered speech signal, an estimate of the number of packets lost in the communication of said speech signal via said communications network.

\* \* \* \* \*